United States Patent [19]

Rockenfeller

[11] Patent Number: 5,441,716
[45] Date of Patent: Aug. 15, 1995

[54] METHOD AND APPARATUS FOR ACHIEVING HIGH REACTION RATES

[75] Inventor: Uwe Rockenfeller, Boulder City, Nev.

[73] Assignee: Rocky Research, Boulder City, Nev.

[21] Appl. No.: 104,427

[22] Filed: Aug. 9, 1993

Related U.S. Application Data

[63] Continuation-in-part of Ser. No. 931,036, Aug. 14, 1992, Pat. No. 5,328,671, and Ser. No. 975,973, Nov. 13, 1992, Pat. No. 5,298,231, which is a continuation of Ser. No. 320,562, Mar. 8, 1989, abandoned.

[51] Int. Cl.$^6$ ............... B01D 53/04; B01D 53/14
[52] U.S. Cl. ................... 423/299; 422/107; 422/221; 422/239; 423/352; 423/539; 423/659; 423/580.1; 564/463; 564/512; 568/700
[58] Field of Search ........... 423/210, 237, 299, 352, 423/437, 539, 659, 580.1; 422/129, 107, 221, 239; 564/463, 512; 568/700

[56] References Cited

U.S. PATENT DOCUMENTS

| | | |
|---|---|---|
| 1,686,425 | 10/1928 | Von Platen et al. |
| 1,881,568 | 10/1932 | Henney . |
| 1,972,426 | 9/1934 | Noebel . |
| 1,987,911 | 2/1935 | Prickett . |
| 2,019,356 | 10/1935 | Normelli . |
| 2,067,678 | 1/1937 | Nesselmann . |
| 2,196,021 | 4/1940 | Merrill . |
| 2,241,600 | 5/1941 | Hunsicker . |
| 2,253,907 | 8/1941 | Levine . |
| 2,326,130 | 8/1943 | Kleen . |
| 2,384,460 | 10/1945 | Kleen . |
| 2,496,459 | 2/1950 | Kleen . |
| 2,521,538 | 9/1950 | Rees . |
| 2,537,720 | 1/1951 | Wagner . |
| 2,649,700 | 8/1953 | Piper . |
| 2,801,706 | 8/1957 | Asker . |
| 2,945,554 | 7/1960 | Berly . |
| 2,989,383 | 6/1961 | Miller . |
| 3,167,399 | 1/1965 | Hansen, Jr. . |
| 4,419,107 | 12/1983 | Roydhouse . |
| 4,581,049 | 4/1986 | Januschkowetz . |
| 4,637,218 | 1/1987 | Tchernev . |
| 4,709,558 | 12/1987 | Matsushita . |
| 4,801,308 | 1/1989 | Keefer . |
| 4,848,994 | 7/1989 | Rockenfeller . |
| 4,906,258 | 3/1990 | Balat et al. . |
| 5,298,231 | 3/1994 | Rockenfeller ............ 423/659 |
| 5,328,671 | 7/1994 | Rockenfeller ............ 423/210 |

FOREIGN PATENT DOCUMENTS

| | | |
|---|---|---|
| 664520 | 5/1965 | Belgium . |
| 0470886 | 2/1992 | European Pat. Off. . |
| 436988 | 11/1926 | Germany . |
| 417044 | 12/1932 | United Kingdom . |
| 415488 | 3/1933 | United Kingdom . |
| 424456 | 4/1934 | United Kingdom . |
| 8500213 | 1/1985 | WIPO . |
| 9010491 | 9/1990 | WIPO . |

OTHER PUBLICATIONS

*Revue Phys. Appl.*, vol. 1 (1983), pp. 107–112, Mauran et al.
*Refrigerating Engineering*. "Absorption Refrigeration with Solid Absorbents", by R. M. Buffington, pp. 137–142 (Sep., 1933).
*Refrigerating Engineering*. "Comfort Cooling in a Refrigerating Plant", by R. H. Smith, p. 152 (Sep., 1933).

*Primary Examiner*—Wayne Langel
*Attorney, Agent, or Firm*—Jerry R. Seiler

[57] ABSTRACT

A chemisorption reaction process is carried out under conditions in which the volumetric expansion of the complex compound reaction product is restricted, and at half-cycle reaction periods of less than 30 minutes each, and/or in a reaction chamber having a maximum mean mass diffusion path length of less than about 15 mm, and/or a maximum heat diffusion path length of less than 1.5 mm.

116 Claims, 2 Drawing Sheets

METHOD AND APPARATUS FOR ACHIEVING HIGH REACTION RATES

This patent application is a continuation-in-part of U.S. patent application Ser. Nos. 07/931,036, filed Aug. 14, 1992, U.S. Pat. No. 5,328,671, and 07/975,973, filed Nov. 13, 1992, U.S. Pat. No. 5,298,231, which is a continuation of 07/320,562, filed Mar. 8, 1989, now abandoned.

BACKGROUND OF THE INVENTION

Adsorption/desorption reactions between polar gases and certain metal salts, often also referred to as "absorption" or "chemisorption" in technical literature, yield complex compounds which are the basis for efficient refrigeration, thermal storage, heat pump systems and power systems having high energy density. However, energy density, a measure of the quantity of polar gas adsorbed on the salt, which translates into the amount of work or energy which can be stored in a given amount of the complex compound, is only one parameter to be considered in designing commercially attractive systems. Of significance, if not greater importance, are the reaction rates between the gas and the complex compound, which result in the time it takes to adsorb and desorb a given amount of the gas into or from the complex compound. Increased or maximized reaction rates result in increased or improved power that can be delivered by the system, i.e., more energy delivered over a period of time, which translates into greater heating and/or cooling or power capability of the system. Complex compounds formed by adsorbing a polar gas and metal salt are characterized by significant, and typically substantial volumetric expansion during the adsorption reaction. Where the adsorption reaction is allowed to proceed without controlling the reaction product density by restricting the volumetric expansion, the resulting reaction product does not achieve the desired coherent, self-supporting mass. Instead, the product is amorphous and powdery, and the product mass will not support its shape or structure. Moreover, once the complex compound is so formed, the physical characteristic of the desired product is substantially irreversible unless successively desorbed and adsorbed without limited expansion, and the desired structure cannot be achieved by further adsorption or desorption unless the complex compound is desorbed, and thereafter introduced into a volumetrically restricted heat exchanger (reaction chamber) cavity and reacted according to the invention. It is also found that such a volumetrically unrestricted complex compound reaction product has substantially reduced adsorption/desorption reaction rates as compared to reaction products in which the volumetric expansion is limited and the density of the reaction product is controlled during the sorption reaction processes if heat and mass transfer is taken into consideration. In application Ser. No. 931,036 the reaction rates of adsorption and desorption of a polar gas with a complex compound are increased by carrying out at least the initial adsorption reaction under conditions so as to achieve a complex compound having a physical structure different from the unreacted salt, and which is at least partially a physically coherent, cohesive, self supporting mass. Such a reaction product is achieved by optimizing the density of the complex compound by limiting the volumetric expansion of the complex compound formed during the initial adsorption reaction. As further disclosed in my aforesaid applications reaction rates are dependent on the thermal conductivity of the solid as well as its gas diffusivity. In order to optimize or maximize the reaction rates, the optimum balance between the thermal conductivity and porosity (gas transport) to provide for high energy or heat transfer balanced with adequate mass transfer or diffusion of the gas through the solid must be achieved. The specific methods and apparatus disclosed in my aforesaid applications for achieving such results are incorporated herein by reference.

SUMMARY OF THE INVENTION

It is the object herein to further describe and define criteria for achieving improved reaction rates as disclosed in my aforesaid applications. It has been found that important criteria for achieving improved reaction rates is in designing and using a sorption reactor having thermal and mass diffusion path lengths within defined limits. Specific reaction parameters and apparatus features and components for achieving such results will be described herein. The initial adsorption reaction may be carried out in the reactor vessel in which it is to be used, or in some other reaction environment under the proper conditions and thereafter the reaction mass transferred to the ultimate reaction vessel having limited volumetric expansion means for the successive reactions. In one embodiment of the invention, a method for improving reaction rates between polar gaseous reactants and inorganic metal salts comprises determining the independent parameters of the thermal diffusion path, and the mass diffusion path for the gaseous reactant through the metal salt, respectively,, in a given reactor or reaction chamber, determining an economically optimized reaction rate between the gas and the salt in the reaction chamber, determining a reaction density of the complex compound needed to achieve the optimum reaction rate, and carrying out the reactions under such conditions as are needed to maintain the desired complex compound properties necessary to achieve the desirable results.

DETAILED DESCRIPTION

According to the invention, solid-gas sorption reactions, i.e., adsorption and desorption of the gas on the solid, are carried out under conditions and in apparatus intended to yield high power densities. Such reactions are preferably capable of achieving maximum power density per mass of adsorbent, maximum power density per mass of reactor and maximum power density per desired or needed reactor volume. Half-cycle times, i.e., adsorption or desorption reaction times of the reactions having improved reaction rates according to the present invention are carried out in less than 30 minutes, preferably in less than about 20 minutes and typically between about 3 and about 15 minutes. It will be understood that not all applications require identical times for adsorption and desorption, and in some cases, one or both reactions may be as short as about 2 minutes, while in other cases, one of the reactions may extend a few minutes beyond 20 minutes. Moreover, during part load conditions, when the equipment is not expected to produce its full cooling capacity, refrigeration, heating or power, reaction times may be extended in order to limit the inherent process cycling and avoiding unnecessary thermal losses. It will be understood that total cycles or full cycle time periods also require a time period for adjusting or changing pressure between adsorption and desorption half-cycles. Thus, a full cycle time period comprises the sum of the half-cycle times plus two pressure-temperature adjustment times, the latter typically each of a few seconds, up to a few minutes.

Optimum reaction rates are dependent on a number of independent parameters including adsorbent density, the mass diffusion path length, the heat or thermal diffusion path length, as well as the thermodynamic operating conditions. The latter include the overall process conditions i.e., the specific temperature and pressure conditions in which the process is carried out, the differential pressure or i.e., the difference between the operating or system pressure and the equilibrium pressure of the complex compound, and the approach temperature or $\Delta T$, which is typically greater than 8°K for the first adsorption reaction. Finally, the parameter of the specific salt and the complex compounds formed between the salt and a specific selected polar gas must be considered, it being understood that the characteristics of such salts and the resulting complex compounds, including the equilibrium pressures thereof, are important determinations in balancing the aforesaid parameters to optimize reaction conditions and achieve a system having maximized reaction rates. As sometimes used herein, the term "optimized reaction product" or "optimized complex compound" is a complex compound in which the polar gas sorption process on the metal salt is carried out under process conditions resulting in a complex compound reaction product having the aforesaid characteristics leading to an economic optimum.

Figure 1:
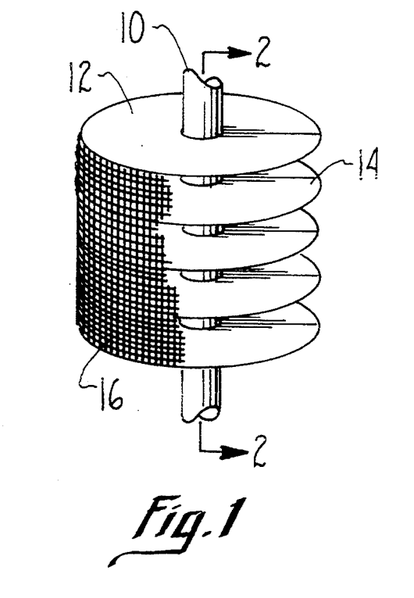
FIG. 1 illustrates a reactor core having a plurality of fixed volume reaction chambers.
Figure 2:
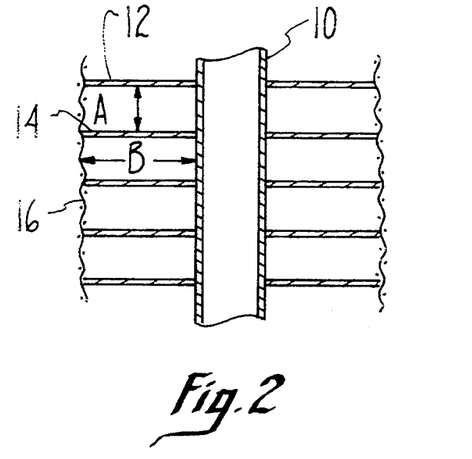
FIG. 2 is a side sectional elevation of a reactor core of FIG. 1.

Each reaction chamber or reactor module has dimensions which provide basis for measuring or determining the thermal diffusion path length (heat transfer) and the mass diffusion path length (mass transfer), respectively. The thermal path length is the distance from a highly thermally conductive surface to the center of the mass of complex compound. A heat conductive fin is an example of such a thermally conductive surface.. In this example thermal diffusion in a given reactor is primarily a function of the fin count, i.e., the number of fins per unit of length (height) of the reactor modules. The greater the number of fins per unit of reactor length, the better the thermal diffusion and the less the thermal diffusion path length. Observing FIGS. 1 and 2, a simplified two dimensional view of a reactor module is shown with a reaction chamber between plates 12 and 14 which extend radially from heat transfer fluid conduit 10. The thermal diffusion path is the path from the most distant particle of complex compound to the nearest heat conductive surface. Thus, for the reaction chamber between heat fins or plates 12 and 14, the simplified thermal path length is one-half the distance A between the two fins 12 and 14. According to the invention, the thermal diffusion path length is less than 4.5 mm, preferably about 4 mm or less, and more preferably about 3.0 mm or less. Utilizing a group of preferred salts disclosed herein the most preferred thermal path length is between 0.6 and 3.2 mm. This is also equivalent of a fin count of at least 4 fins per inch, and preferably from about 9 to 25 fins per inch (1.4 mm to 0.5 mm thermal path length), or higher if practical for manufacture, for optimized power density requirements. The preferred thermal path length ranges for some specific salts is shown in Table I below. It will be understood that such a simplified path length determination does not take into consideration the tube wall, although that surface is also a contributor to the thermal path. Typical suitable and practical fin thickness will vary from about 0.07 mm to about 2 mm. Where thermal diffusion path lengths are relatively short, less fin thickness is usually preferred. The fin thickness is typically set to give a small temperature drop or rise in the fin as compared to desorption or adsorption approach temperature. The determination or measurement of the thermal path length can be readily determined for any three dimensional reaction chamber. The reactor core shown in FIGS. 1 and 2 is by way of illustration only, and other reactors shown and described in the aforesaid co-pending application Ser. No. 975,973 are also examples, the description thereof which is incorporated herein by reference.

Figure 3:
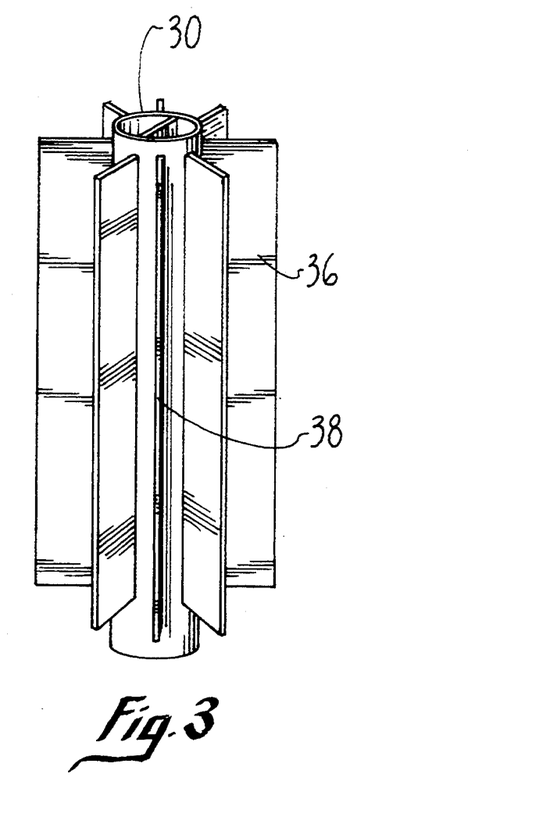
FIG. 3 is a prospective view illustrating another reactor embodiment.

The size and shape of the fins or heat exchanger or thermal conducting surfaces is based on common heat transfer calculations understood by those skilled in the art. For example, observing also FIG. 3, the heat exchanger illustrated incorporates a plurality of heat exchange surfaces or fins extending vertically radially along heat exchange fluid conduit 30. The distance between the plates is varied because of the wedge-like shape of the different reaction chambers between adjacent plates which are not parallel. However, the average distance between two adjacent plates 36 and 38 will be measured at a point halfway between the inner and outer edges of the respective plates. In reactors of a design in which fin height is quite low or small, or in which the fin count is low, the proximity of a salt or complex compound molecule to a prime heat transfer surface such as tubes or plates also becomes important in determining the thermal path length. Measurement and determination of the thermal path length may be made regardless of the shape or size of the adjacent solid fin or reaction chamber wall surfaces extending from and in thermal communication with the heat exchange conduit or conduits extending through the reactor. Such heat exchange surfaces, walls or fins also usually comprise the gas impermeable reactor module walls which define or form the reaction chamber or chambers within the reactor.

Figure 4:
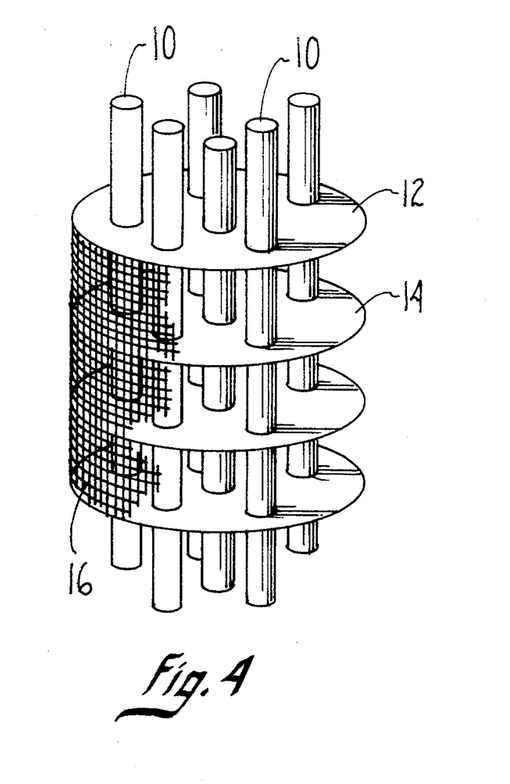
FIG. 4 illustrates a multiple tube fin plate reactor core.
Figures 5, 6, 7, 8:
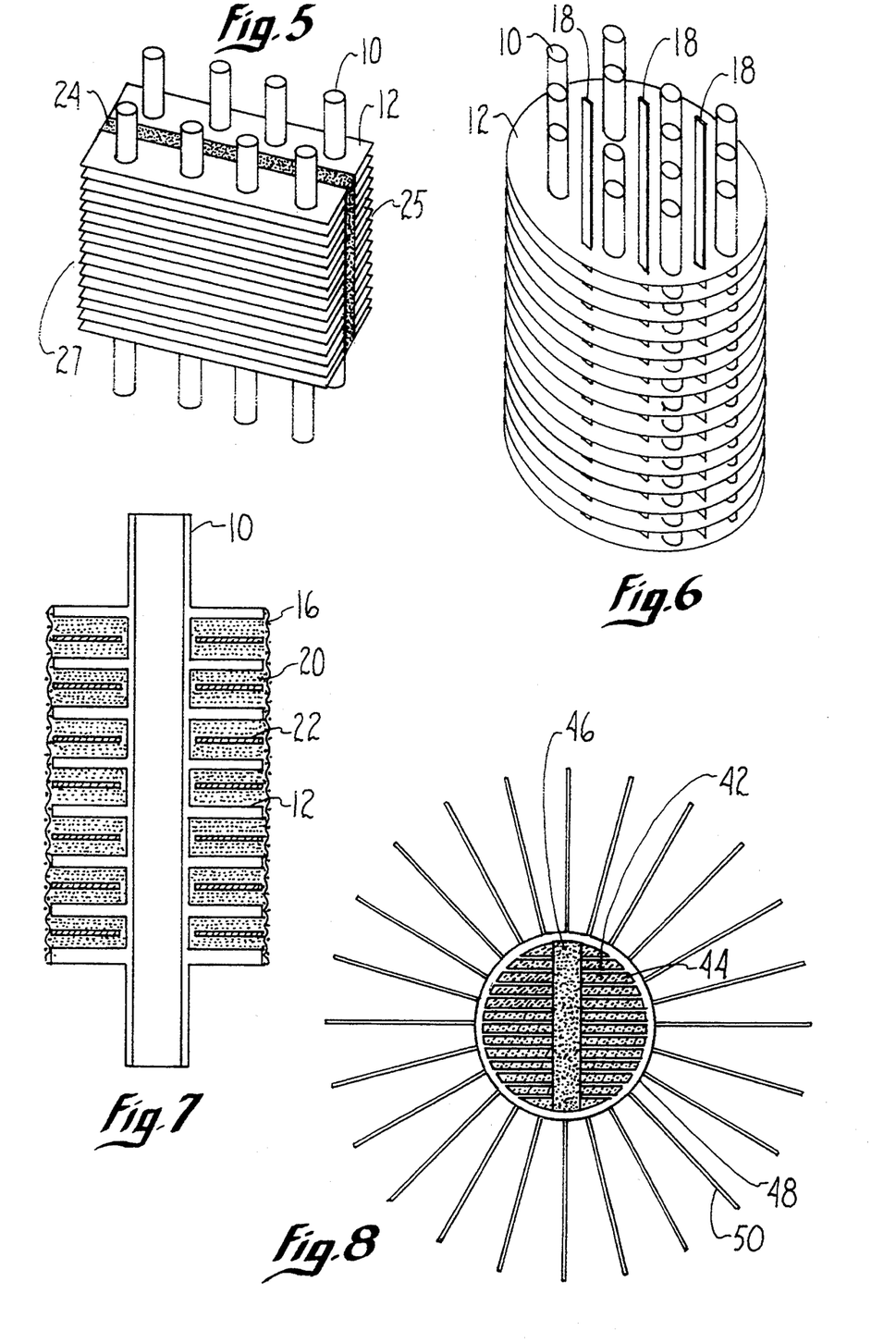
FIG. 5 illustrates a reactor design using a layer of gas permeable material such as fire brick sandwiched between multiple tube fin reactor cores.
FIG. 6 shows a multiple tube fin reactor core with slots for inserting gas permeable material along the reactor plates on fins.
FIG. 7 shows a reactor core design incorporating gas permeable discs spaced within adsorbent layers between reactor fins.
FIG. 8 is a sectional view illustrating yet another reactor core design.

Other examples of a suitable reactor core design are shown in FIGS. 4–7. The reactor core of FIG. 4 is a tube fin reactor utilizing multiple tubes 10 for directing heat transfer fluids through the reactor in thermal contact with the adsorption layer confined between the plates or fins 12 and 14 and gas permeable wall 16. In FIG. 5, a layer 24 of gas permeable material such as fire brick, etc., is sandwiched between reactor cores 25 and 27. A reactor comprises as many multiple layers of reactor cores and gas permeable material as desired. The fire brick may extend around the perimeter of the reactor fins or plates 12 thereby encasing the entire reactor core. In FIGS. 6 and 7, reactor cores are shown which illustrate other examples of gas distribution means. In FIG. 6, a plurality of elongated slots 18 are formed in reactor plates 12 for installing gas permeable materials such as fire brick, pumice, slabs or sheets of permeable ceramic, permeable cement, open cell plastic foams or the like. In FIG. 7, discs 22 of such gas permeable materials are spaced within layers of adsorbent salt 20. In both of these embodiments gas distribution through the mass of salt or complex compound is enhanced and reaction rates improved as the mass diffusion path length, and particularly the mean mass distribution path length as will be further explained hereinafter, is reduced or optimized. The reactor core design of FIG. 8 incorporates an interior core containing layers of adsorbent salt 44 between fin plates 42. The reactor core center contains a member 46 of gas permeable material (fire brick, etc.), all of which is enclosed in reactor wall 48 having a plurality of external heat exchange fins 50 radially extending therefrom. Such a reactor design is particularly suitable for air-cooled reactor systems. Other heat transfer fin plate designs and shapes such as tapered or spiral fins, etc., may also be used in reactor construction.

Although thermal diffusion path length is a highly important parameter, as set forth above, the mass diffusion path length, i.e., the path length of a refrigerant molecule to and from an adsorption particle or molecule, is also quite critical in reactors or reaction chambers in which the density of the reaction product mass has been controlled by limiting the volumetric expansion, according to the present invention. In order to achieve the high reaction rates according to the present invention a reactor or reaction apparatus must be designed for the capability of moving a substantial amount of refrigerant within the adsorbent mass in a relatively short period of time. For this reason, the mass diffusion path length of the reactor is of utmost importance. The mass diffusion path length is determined by measuring the distance between the point or surface of entry of the gas into the adsorbent mass (reaction chamber or module) to the opposite end or wall of the chamber, which represents the greatest distance the gas must travel to and from molecules or particles of complex compound during adsorption and desorption cycles. For example, again observing FIG. 2, in the simplified, two dimensional reactor shown, gas permeable wall 16 through which the gas enters and exits the reaction chambers extends around the outer edge of the heat exchange fins. The distance from the gas permeable wall to the opposite interior surface of a reaction chamber along conduit 10 is dimension B, which may be readily measured and determined. Observing also the reactor in FIG. 3, a maximum mass diffusion path length dimension will be the distance between the outer edge of each of the reactor fins and the interior fin edge extending along conduit 30. Again, this dimension is readily determined for any reaction chamber size or shape. However, the important consideration in determining the desirable, preferred or optimized mass diffusion path lengths must take into account the entire mass of adsorbent particles relative to gas distribution means, i.e., port, vent, etc., from which the gas is directed into and from the adsorbent mass within the reaction chamber. It is also to be understood that the flow of refrigerant through the sorbent mass, to and from the adsorption sites, is not simply based on gas permeability or penetration through a porous medium, nor is it based only on gas penetration through a dense product mass contained in a limited volume. Instead, in the present chemisorption reaction process, the complex compound adsorbent changes its properties throughout the process as it coordinates and adsorbs the gas molecules. Since the coordination is typically a polar gas adsorbed on the complex compound in one or more coordination spheres, sorption rates are impacted by both the coordination site coverage and by the shielding resulting from accumulation of coordinated polar gas molecules facing incoming polar gas molecules during adsorption. Accordingly, the mass flow path length or mean mass diffusion path becomes extremely important and critical to achieving high reaction rates and power density according to the invention. Thus, in any reactor, not only is a maximum mass transfer distance to an adsorbent particle to be considered, but also the average or mean distance the gas must travel to and from all particles of the mass. As used herein, the term mean mass diffusion path length or distance is defined as the arithmetic mean over all particles of the shortest distance from every particle to a gas permeable surface bordering the compound, gas distribution inlet, outlet or other gas distribution means. Thus, the mean mass diffusion path length=

$$\frac{\sum_{i=1}^{n} d_i}{n}$$

where $d_i$=shortest distance from $i^{th}$ particle to a gas permeable surface and n=number of particles.

According to the invention, for rapid adsorption and desorption reactions sorbing a substantial amount of the theoretically available refrigerant coordination sphere in less than about 30 minutes and preferably less than 20 minutes, for each absorption and desorption cycle, the mean mass diffusion path length is less than 15 mm, and preferably about 13 mm or less and more preferably less than 8 mm. In order to meet this critical requirement, the reactor or reaction chamber or chambers of the apparatus in which the adsorbent is present and the gas distribution components, i.e., tubes, reactor walls, channels, inlets, ports, vents etc., are preferably designed so that the mean mass diffusion path as defined above, in such a reactor is 15 mm or less. It is also preferred that at least 60% of the metal salt or complex compound, by weight, is within 25 mm or less of such a gas distribution component. For the group of preferred salts disclosed herein, the most preferred mean mass diffusion path length is between 3 and 7 mm. The specific preferred mean mass diffusion path length range for some specific salts is shown in Table I below.

From the above, it will be evident that both the thermal and mass diffusion path lengths may be changed or varied by selecting or designing a reactor having reaction chambers (modules) of desirable fin depth and reaction chamber height dimensions. An increase of the fin count, or number of fins per unit length of the reactor, will increase the system thermal conductivity and reduce the thermal path length. Likewise, the mass diffusion path length may be selected by selecting or designing a reactor having a greater or smaller distance between the gas permeable means through which the gaseous reactant passes during the alternate adsorption and desorption reaction phases, and the opposite inner end of the reaction chamber. For example, additional slots, gas tubing or gas permeable materials such as fire brick, porous cement, sintered metals or ceramics, etc., may be used in reactor assembly design for increasing gas inlet and outlet exposure for reducing mass diffusion path lengths. In designing or selecting reactors and reaction chamber configurations, these two independent parameters may be considered and selected to give a reactor having the reaction chambers of the desired heat diffusion and mass diffusion path lengths giving optimum or preferred reaction rates. Accordingly, optimum reactors capable of achieving desired reaction rates and power density according to the invention will have both thermal (heat) and mass diffusion path lengths as set forth above.

In designing reactor cores for optimizing the reactor module or reaction chamber dimensions pursuant to the invention, although relatively short gas diffusion paths are desirable from a reaction rate standpoint, the weight ratio of heat exchanger hardware to adsorbent may become prohibitive. In order to balance these features, the following principals may be applied. The heat transfer surface extension may be made of a thermally conductive and gas permeable material having less gas flow resistance than is encountered in the complex compound. For such an advantage the reactor core fin plates themselves may be designed to conduct gas through the fin or plate surface directly to the layer of adsorbent on each side of or otherwise in contact with the fin plate. Examples of suitable fin plate material include sintered and powdered sintered metals, metal foams, or highly conductive non-metal ceramics or other porous materials. Utilizing such fin plates for both heat transfer and gas distribution, the mass transfer distance described above, for example, particularly regarding distance B in FIG. 2, would no longer apply, since with fins or plates 12 and 14 comprising the mass distribution surfaces, the dimension A would become both the heat and mass transfer path distance to be considered. Secondly, where the use of gas permeable reactor fin plates for both heat and mass transport is not desirable, gas permeable discs spaced between reactor fin plates as illustrated in FIG. 7 may be used. Such gas permeable disc materials which are compatible with the solid reactant and gaseous refrigerant offer low gas resistance, and substantially enhance and contribute to increased gas distribution throughout the solid adsorbent. A third means for increasing gas diffusion through the complex compound is by using a gas permeable or porous material added to the salt, with the mixture then being introduced into the reactor core. Of particular interest are materials which may be mixed with the adsorbent salt and which have geometries that offer a directional flow for gas through the salt and complex compound mass. Such materials are referred to herein as gas directional flow admixture components or gas distribution admixture compositions. These materials may be used to enhance the overall gas or refrigerant transport to and from the sorption sites of complex compounds or mixtures which contain complex compounds and comprise components having elongated or extended microporous surfaces such as microtubes or other suitable geometries of materials that are gas permeable and have a gas transport resistance lower than the complex compound adsorbent during adsorption and/or desorption. Examples of such materials include open cell metal, plastic or ceramic foams, porous cement, ceramics, sintered metals and powdered sintered metals (ferrous or nonferrous), perforated metals or tubing, wire woven tubing and the like, all of which are gas permeable. Representative suppliers for sintered and powdered sintered metals and perforated tubing are Pacific Sintered Metals and Perforated Tubes, Inc. A supplier of woven tubing is Tylinter. Zircar Fibrous Ceramics is a manufacturer of ceramics such as zirconia, alumina, alumina-silica, $Y_2O_3$, $Ta_2O_5$, $HfO_2$ and $CeO_2$. The powdered sintered and sintered members are available in steel, stainless steel and many alloys such as nickel, chrome, molybdenum, tungsten, etc. while perforated metal tubing is available in aluminum, steel, stainless steel, monel and many other alloys. Wire woven materials comprising tubing or porous sticks are available in almost all metals, plastics, ceramics and the like. The specific metal or composition material selected for the powdered sintered, sintered or woven micro-tubes is not particularly critical as long as it is compatible with the gas and adsorbent under process conditions. In some cases materials of higher thermal conductivity are preferred, if such components are intended to also enhance heat transfer. Although the specific material used for the gas directional flow admixture components is not critical, an important requirement is the hole or pore size in any such material, regardless of its shape, e.g. tube, disk, wire, plate or sheet. Due to the particle size of the adsorbent and because solid migration into the gas distribution pores is to be avoided preferred gas distribution pores or openings are less than 100 microns, preferably less than 50 microns, but in no event higher than practical to avoid such migration and occlusion or plugging of the pores, unless a thin surface cover protects the bulk of the gas distribution components against such migration. Typical dimensions for the above-described disc, tube and wire components are a minimum diameter or disc thickness of about 0.1 mm and preferably higher. Plate thicknesses, for mechanical reasons are at least that high. Upper thickness limits are not necessarily technically limited, but for practical reasons thickness of more than 4 mm for tubes and wires, 5 mm for discs and sheets and 10 mm for plates often do not yield any benefit. Such gas directional flow admixture components may be introduced into and mixed with the adsorbent salt composition in effective amounts for example of up to a few percent and up to about 30%, by volume, and may be oriented for efficiently transporting the gas to the most desired and most remote adsorbent particles within the reactor core. It is also desirable to have such components in contact with the reactant gas (refrigerant) atmosphere or at least at a relatively close proximity in order to avoid excessive transport through the complex compound prior to the gas reaching the gas distribution admixture components so that the gas distribution or mass diffusion interface is actually the interface or border of the gas distribution admixture components and the complex compound.

It should be understood and appreciated that the "optimum" reactor module or reaction chamber dimensions and fin height and/or count or sorbent density will vary due to the process parameters for which the apparatus is to be used. For example, where the apparatus is to be used in a heat pump, the optimized reaction chamber dimensions and/or configurations including fin count, fin height, etc., may be quite different than a reaction chamber to be used in a thermal energy storage or low temperature freezer environment. In a heat pump, where the reaction cycle times are relatively short, and with ΔP typically about 1 bar or higher, and approach temperatures, ΔT, typically between about 10° and 30° K or higher, optimization of both heat and mass transfer is quite important. On the other hand, for the thermal energy storage systems where ΔP is often less than 1 bar, typically between about 0.15 and about 0.6 bar, and ΔT is often between about 4° and 8° K, the criterion of mass diffusion path length (mass transfer) is of significantly greater importance than heat transfer. Similarly, in low temperature freezer apparatus applications, to achieve cooling temperatures in the minus 70° F. range, the pressure approaches (ΔP) are very low, typically about 0.1 bar, with mass diffusion path length of significant importance as compared to the heat transfer characteristics of the apparatus. Thus, in such systems, it is necessary or desirable to design the apparatus with relatively short mass transfer paths and/or lower compound density for optimizing the mass transfer or mass diffusion paths. Accordingly, it will be evident to those skilled in the art that optimization of the reactor modules or reaction chambers will take into consideration the intended uses of the equipment by considering the aforesaid parameters.

Another parameter to be determined is the mass of salt per unit volume of reaction chamber cavity, or loading density of the solid particulate metal salt introduced into the reactor and the optimum density of the resulting complex compound reaction product to achieve the optimum or desired reaction rates for adsorbing and desorbing the gaseous reactant to and from the complex compound. In order to achieve the desired or optimum density of the complex compound in a reactor having a fixed volume, the amount or volume of unreacted salt introduced into the reaction chambers must be sufficient so that when the complex compound reaction mass structure is produced during the sorption process reaction, the volumetric expansion results in each reaction chamber or module being filled with the newly formed complex compound structure composition having the desired density. Normally, the density of the complex compound formed will be lower than the density of the salt before the initial reaction, although the density of a fully adsorbed complex compound is often higher. The density of the complex compound, will also vary depending on the operating conditions, i.e., pressure and temperature. Each salt and complex compound will react somewhat differently at different temperatures and pressures. Thus, such operating conditions, as well as the equilibrium pressure of the complex compound and the approach pressure, must be considered. Accordingly, the optimized density for each complex compound under such operating conditions must also be independently determined. According to the invention, the loading density of the adsorbent salts for reacting with ammonia in the heat exchanger cavity is preferably between about 0.2 and 1.0 g/cc, and more preferably between about 0.3 and 0.8 g/cc but for salts having a high bulk or pour density, the loading density may exceed 1 g/cc in particular for adsorbents of relatively high molecular weight. However, according to the invention, these density ranges must also take into account the above disclosed heat and mass transfer parameters. Thus, the selection of a salt density within the aforesaid limits is to be used in a reactor or reaction chamber having a thermal diffusion path length, and/or a mass diffusion path length as set forth and described hereinabove. The preferred loading density ranges for some specific adsorbent salts used in ammonia refrigerant systems are also shown in Table I below. Again, it is to be understood that such densities are not intended to be absolute or independent for use in reactors having heat and/or mass diffusion path lengths outside of the above described parameters. In the table, the numerical values shown are the adsorbent densities of uncomplexed salt for the ammoniated complex compounds throughout the given range of $NH_3$ coordination steps. The pressures given are those typically used or encountered by a system evaporator, or the pressure of a desorbing reactor to another system reactor or to a condenser or other adsorbing reactor. The density values are shown in grams/cc, and the mean mass diffusion path length and thermal path length values are in millimeters. The actual gas uptake may be less than the coordination step if salt loading densities exceed values which lead to insufficient volume for complete gas uptake.

TABLE I

| Complex Compound | Pressure (psia) | | Most Preferred Range | Preferred Range |
|---|---|---|---|---|
| $SrCl_2$ • 1/8 | above 40 | density | 0.5 to 0.7 | 0.4 to 0.9 |
| | | mass | 3 to 7 | 2 to 8 |
| | | thermal | 0.6 to 2.5 | 0.5 to 3.5 |
| $SrCl_2$ • 1/8 | below 40 | density | 0.4 to 0.7 | 0.4 to 0.8 |
| | | mass | 2.5 to 7 | 2 to 8 |
| | | thermal | 0.6 to 2.5 | 0.5 to 3.5 |
| $CaBr_2$, $FeBr_2$ or $CoBr_2$ • 2/6 $CrBr_3$ • 0/3 | above 40 | density | 0.5 to 0.8 | 0.4 to 0.8 |
| | | mass | 3 to 6 | 2 to 8 |
| | | thermal | 0.6 to 3 | 0.5 to 4 |
| $CaBr_2$, $FeBr_2$ or $CoBr_2$ • 2/6 $CrBr_3$ • 0/3 | below 40 | density | 0.5 to 0.8 | 0.4 to 0.8 |
| | | mass | 3 to 6 | 2 to 8 |
| | | thermal | 0.6 to 3 | 0.5 to 4 |
| $CaBr_2$, $FeBr_2$ or $CoBr_2$ • 2/6 $CrBr_3$ • 0/3 | below 10 | density | 0.4 to 0.7 | 0.3 to 0.7 |
| | | mass | 3 to 6 | 2 to 8 |
| | | thermal | 0.6 to 3 | 0.5 to 4 |
| $CaCl_2$ • 2/4, 4/8 $ZnCl_2$ • 0/1, 1/2 $ZnCl_2$ • 2/4, 4/6 | above 40 | density | 0.4 to 0.6 | 0.3 to 0.7 |
| | | mass | 3 to 6 | 2 to 8 |
| | | thermal | 0.7 to 3 | 0.5 to 4 |
| $CaCl_2$ • 2/4, 4/8 $ZnCl_2$ • 0/1, 1/2 $ZnCl_2$ • 2/4, 4/6 | below 40 | density | 0.3 to 0.6 | 0.3 to 0.7 |
| | | mass | 2.5 to 6 | 2 to 8 |
| | | thermal | 0.6 to 3 | 0.5 to 4 |
| $CaCl_2$ • 2/4, 4/8 $ZnCl_2$ • 0/1, 1/2 $ZnCl_2$ • 2/4, 4/6 | below 20 | density | 0.2 to 0.6 | 0.2 to 0.6 |
| | | mass | 2.5 to 6 | 2 to 8 |
| | | thermal | 0.6 to 3 | 0.5 to 4 |
| $SrBr_2$ • 2/8 | above 40 | density | .5 to 1.4 | .5 to 1.8 |
| | | | 3 to 6 | 2 to 8 |
| | | | 0.6 to 3 | 0.5 to 4 |
| $SrBr_2$ • 2/8 | between 25 and 40 | density | 0.5 to 0.8 | 0.4 to 1.1 |
| | | mass | 3 to 6 | 2 to 8 |
| | | thermal | 0.6 to 3 | 0.5 to 4 |
| $SrBr_2$ • 2/8 | below 25 | density | 0.4 to 0.8 | 0.4 to 1.1 |
| | | mass | 2.5 to 6 | 2 to 8 |
| | | thermal | 0.6 to 3 | 0.5 to 4 |
| LiCl • | above 40 | density | 0.3 to 0.5 | 0.2 to 0.6 |

TABLE I-continued

| Complex Compound | Pressure (psia) | | Most Preferred Range | Preferred Range |
|---|---|---|---|---|
| 0/3 (steps) | | mass | 3 to 6 | 2 to 8 |
| | | thermal | 0.6 to 3 | 0.5 to 4 |
| LiCl • 0/3 (steps) | below 40 | density | 0.2 to 0.5 | 0.2 to 0.6 |
| | | mass | 2.5 to 6 | 2 to 8 |
| | | thermal | 0.6 to 3 | 0.5 to 4 |
| MnCl₂• 2/6 | above 40 | density | 0.4 to 0.8 | 0.3 to 0.9 |
| | | mass | 3 to 6 | 2 to 8 |
| MgCl₂• 2/6 | | thermal | 0.6 to 3 | 0.5 to 4 |
| MnCl₂• 2/6 | below 40 | density | 0.3 to 0.7 | 0.2 to 0.8 |
| | | mass | 2.5 to 6 | 2 to 8 |
| MgCl₂• 2/6 | | thermal | 0.6 to 3 | 0.5 to 4 |
| CoCl₂• 2/6 | above 40 | density | 0.4 to 0.8 | 0.3 to 0.8 |
| | | mass | 3 to 6 | 2 to 8 |
| CrCl₂• 0/3, 3/6 VCl₃ 0/3, 3/5 | | thermal | 0.6 to 3 | 0.5 to 4 |
| CoCl₂• 2/6 | below 40 | density | 0.3 to 0.8 | 0.2 to 0.8 |
| | | mass | 3 to 6 | 2 to 8 |
| CrCl₂• 0/3, 3/6 VCl₃• 0/3, 3/5 | | thermal | 0.6 to 3 | 0.5 to 4 |
| CoCl₂• 2/6 | below 15 | density | 0.2 to 0.7 | 0.15 to 0.7 |
| | | mass | 2.5 to 6 | 2 to 8 |
| CrCl₂• 0/3, 3/6 VCl₃• 0/3, 3/5 | | thermal | 0.6 to 3 | 0.5 to 4 |
| CoCl₂• 0/1, 1/2 | above 40 | density | 0.5 to 0.8 | 0.4 to 0.9 |
| | | mass | 3 to 6 | 2 to 8 |
| | | thermal | 0.6 to 3 | 0.5 to 4 |
| CoCl₂• 0/1, 1/2 | below 40 | density | 0.3 to 0.8 | 0.2 to 0.9 |
| | | mass | 2.5 to 6 | 2 to 8 |
| | | thermal | 0.6 to 3 | 0.5 to 4 |
| BaCl₂• 0/8 NH₃ | above 25 | density | 0.5 to 0.9 | 0.4 to 1.0 |
| | | mass | 3 to 6 | 2 to 8 |
| | | thermal | 0.6 to 3 | 0.5 to 4 |
| BaCl₂• 0/8 NH₃ | below 25 | density | 0.4 to 0.8 | 0.3 to 0.9 |
| | | mass | 3 to 6 | 2 to 8 |
| | | thermal | 0.6 to 3 | 0.5 to 4 |
| NiCl₂• 2/6 | above 40 | density | 0.3 to 0.7 | 0.2 to 0.7 |
| | | mass | 3 to 6 | 2 to 8 |
| | | thermal | 0.6 to 3 | 0.5 to 4 |
| NiCl₂• 2/6 | below 40 | density | 0.2 to 0.6 | 0.2 to 0.7 |
| | | mass | 3 to 6 | 2 to 8 |
| | | thermal | 0.6 to 3 | 0.5 to 4 |
| CaI₂• 2/6 | above 40 | density | 0.4 to 0.9 | 0.4 to 1.0 |
| | | mass | 3 to 6 | 2 to 8 |
| | | thermal | 0.6 to 3 | 0.5 to 4 |
| CaI₂• 2/6 | below 40 | density | 0.3 to 0.9 | 0.3 to 1.0 |
| | | mass | 3 to 6 | 2 to 8 |
| | | thermal | 0.6 to 3 | 0.5 to 4 |
| CaCl₂• 0/1, 1/2 | above 40 | density | 0.4 to 0.7 | 0.3 to 0.9 |
| | | mass | 3 to 6 | 2 to 8 |
| | | thermal | 0.6 to 3 | 0.5 to 4 |
| CaCl₂• 0/1, 1/2 | below 40 | density | 0.2 to 0.7 | 0.2 to 0.8 |
| | | mass | 3 to 6 | 2 to 8 |
| | | thermal | 0.6 to 3 | 0.5 to 4 |

Ammonia complexes of CuCl, CuCl₂, SnCl₂, AlCl₃, NaCl, KCl, FeCl₂ and multi-metal chloride salts with at least one metal of Cr, Cu, Zn, Sn, Al, Na, K, Sr, Ca, Co, Fe, Ba, Mn, Mg, Li, Ni:

| | above 40 | density | 0.4 to 0.8 | 0.3 to 0.9 |
|---|---|---|---|---|
| | | mass | 3 to 6 | 2 to 8 |
| | | thermal | 0.6 to 3 | 0.5 to 4 |
| | below 40 | density | 0.3 to 0.8 | 0.2 to 0.8 |
| | | mass | 3 to 6 | 2 to 8 |
| | | thermal | 0.6 to 3 | 0.5 to 4 |

Bromides, iodides, sulfates, nitrates, perchlorates of Cr, Cu, Zn, Sn, Al, Na, K, Fe and multi-metal adsorbents with at least one metal of Cr, Cu, Zn, Sn, Al, Na, K, Sr, Ca, Co, Fe, Ba, Mn, Mg, Li, Ni. and multiple anion salts:

| | above 40 | density | 0.4 to 0.8 | 0.3 to 1.0 |
|---|---|---|---|---|
| | | mass | 3 to 6 | 2 to 8 |
| | | thermal | 0.6 to 3 | 0.5 to 4 |
| | below 40 | density | 0.3 to 0.8 | 0.2 to 0.9 |
| | | mass | 3 to 6 | 2 to 8 |
| | | thermal | 0.6 to 3 | 0.5 to 4 |

It has been found that for a given pressure and temperature, the salts of lower molecular weights often tend to optimize at lower loading densities and salts with higher molecular weights at higher densities. It has also been found that for some salts having a molecular weight of about 200 or more, for example, some bromides, iodides, oxalates, sulfates and more importantly which have a pour density of above about one kilogram per liter, where the system is to be operated in ranges above 40-45 psia, suitable loading densities of above about 1.0 grams/cc and up to 1.8-1.9 grams/cc may be used because such salts are dense enough to still expand in a limited expansion volume. In addition, for such salts and for such high pressure use, the mass diffusion path lengths may be increased by 2 or 3 mm. Moreover, where lower pressure refrigerants such as water, alcohols (methanol, ethanol, propanol) and amines (methylamine, ethylamine, diamines), the optimum densities and/or diffusion paths are typically lower as compared to ammonia.

One skilled in the art knowing the expansion characteristics of the complex compound to be produced, depending upon the salt and polar gas selected, the operating conditions to be used, and the measurement and determination of the independent gas diffusion path and thermal diffusion path dimensions of the reaction chamber or chambers, will also be able to determine the amount of the starting, unreacted particulate metal salt to be introduced into the reaction chamber which determines the density according to the invention. Because of the complex nature of the combined mass diffusion and heat transfer processes, and taking in consideration the other parameters mentioned hereinabove to achieve the desired system characteristics, optimization of the system is usually performed experimentally by varying the approach temperatures and/or pressures, as well as the absolute temperature of the reactions, compound density and the geometry of the reactor module, and measuring the corresponding sorption rates and their extent.

Specific improvements in the reaction rates by optimizing the heat diffusion and mass diffusion path lengths and the complex compound density result in substantial improvements and increase in the reactor economics. This improvement substantially impacts on the efficiency of the complex compounds and concomitantly, the amount of energy which can be provided by the system or apparatus in a given reaction cycle period. For example, in some equipment applications reaction rates of approximately 10-15 moles/mol-hr. imply half-cycle periods of about ten to twelve minutes, i.e., a ten minute time required for adsorbing or desorbing the desired amount of gaseous ligand from the complex compound. By comparison, reaction rates of 25 to 35 moles/mol-hr. imply half-cycle periods of about five to seven minutes, thereby approximately doubling the energy available from such a system for a given time period of operation. The high reaction rates obtained by using the optimized reactors as previously described are capable of being sustained not only for short cycle periods, but over periods of up to 20 minutes, or more. Thus, reaction rates of above 6 moles/mol-hr, typically 10–20 moles/mol-hr may be sustained for at least 6 minutes, typically up to 12–15 minutes and for some reactions up to 20–30 minutes. The aforesaid reaction rate figures are averages, based on the average of the reaction rates up to the time when the reaction is complete or otherwise terminated. Such improvement translates directly into substantially increased cooling and/or heating or power capacity for any given size of reactor systems. Accordingly, by reducing the cycle times as a result of the increased reaction rates, the tonnage of cooling capacity for a given amount or mass of complex compound used in the system or apparatus is correspondingly increased. Such an improvement allows for either greater cooling and/or heating or power capacities of heat pumps or similar refrigeration or power devices utilizing such improvements or substantially smaller and lighter heat pumps or other devices to produce a given amount of cooling and/or heating capacity.

According to the invention, the sorption reaction process is carried out under conditions for limiting the volumetric expansion of the reaction product and which may result in a complex compound solid having a physical mass that is different from that of the unreacted salt. The unreacted metal salt is typically a powdery particulate or granular material, usually pourable and freely flowing in its dry and uncoordinated form, and which readily conforms to the interior shape of the reaction chamber into which it is introduced. Where the complex compound is formed under sorption reaction conditions in which the density of the reaction product is controlled and optimized by restricting the volumetric expansion according to the invention, the complex compound reaction product often has a substantially different structure and physical property which is at least partially immobilized and self-supporting. For many of the salts, following a single adsorption cycle with volumetric expansion control, substantially the entire complex compound reaction product is a stiffened, coherent, cohesive, self-supporting mass which maintains its shape, even after the gaseous reactant is substantially completely desorbed therefrom and thereafter through repeated adsorption/desorption cycles in a volumetrically restricted reaction chamber. For other complex compounds, a portion of the reaction product has the aforesaid reaction properties. Moreover, the complex compound reaction product mass will maintain its new structure without falling apart or becoming powdery if maintained in its restricted volume throughout the sorption process unless it is subjected to substantial physical abuse or deterioration. Specifically, the ammoniated complex compounds of $SrCl_2$, $SrBr_2$, $CaCl_2$, $CaBr_2$, $CaI_2$, $CoCl_2$, $CoBr_2$, $BaCl_2$, $BaBr_2$, $MgCl_2$, $MgBr_2$, $FeCl_2$, $FeBr_2$, $NiCl_2$, $ZnCl_2$, $MnCl_2$, $MnBr_2$, $CrCl_2$, $SnCl_2$, $SnBr_2$, and $LiCl$ when reacted under volumetrically restricted conditions according to the invention are found to be stabilized or immobilized in the form of a homogenous mass which is stiff and structurally physically quite self-supporting. Depending on the loading density, the structure of the ammoniated complex compound of $CaBr_2 \bullet 2$–$6$ $(NH_3)$ is an example of a complex compound which may not be always totally or fully immobilized, cohesive or homogenous. It is to be understood that the high reaction rates of the improved complex compounds formed according to the invention are not dependent on the specific physical characteristics of the different reaction products. Thus, improved reaction rates are inherent with the reaction products formed by properly controlled and limited volumetric expansion during the sorption process with appropriate heat and mass diffusion paths regardless of whether the resulting product is highly coherent, self-supporting and physically homogeneous, or whether it is only partially coherent and self-supporting. Because the reaction products formed during the aforesaid adsorption reaction normally expand against the reaction chamber surfaces, the reaction products also provide for improved heat transfer due to the extent of physical contact with the heat transfer surfaces of the reactor. The aforesaid complex compound structures are achieved without using other binders, additives, mechanical sintering, baking or the like, but are accomplished substantially exclusively by carrying out the initial adsorption reaction under the proper volumetric expansion restriction and density maintenance conditions typically with air removed from the sorption chamber prior to the sorption. As previously noted, the initial adsorption reaction or series of sorption reactions may be carried out with volumetric expansion restrictions in the reactor or reaction module of the system in which it is to be used or in a different reactor. Thus, the sorption reactions may be first carried out in a separate vessel under suitable salt loading and volumetric expansion prevention or limiting conditions to achieve the desired physically self-supporting, cohesive and coherent mass which may then be removed from the initial reactor vessel and placed in an ultimate system reactor having volumetric expansion limiting means. Because such a pre-formed complex compound reaction product has been formed under the reaction conditions according to the invention, the complex compound reaction mass will function in the different reactor as if it was initially formed therein and yield the same improved power density performance results.

The complex compounds for which improved reaction rates are achieved according to the present invention comprise the chemisorption reaction products of a metal salt in the form of a solid particulate reactant, on which is adsorbed a polar gaseous reactant capable of forming a covalent coordinative bond with the salt. Although the preferred designation of the reaction is "adsorption," the reactions are also sometimes referred to as absorption or chemisorption reactions or products. The preferred complex compounds are disclosed in U.S. Pat. No. 4,848,994, the description of which is incorporated herein by reference, as are those described in the aforesaid incorporated co-pending applications. The preferred polar gaseous reactants are ammonia, water, sulfur dioxide, lower alkanols ($C_1$–$C_5$), alkylamines, polyamines and phosphine. Preferred metal salts include the nitrates, nitrites, perchlorates, oxalates, sulfates, sulfites and halides, particularly chlorides, bromides and iodides of alkali metals, alkaline earth metals, transition metals, particularly chromium, manganese, iron, cobalt, nickel, copper, tantalum and rhenium, as well as zinc, cadmium, tin and aluminum. Double metal chloride salts, in which at least one of the metals is an alkali or alkaline earth metal, aluminum, chromium, copper, zinc, tin, manganese, iron, nickel or cobalt are also useful. Another salt of special interest is $NaBF_4$. Other complex compounds are those disclosed in co-pending applications, Ser. Nos. 732,652 filed Jul. 19, 1991 and 813,283 filed Dec. 20, 1991, and incorporated herein by reference. Preferred complex compounds used in the reaction of the invention are the following or comprise adsorption/desorption compositions containing at least one of the following as a component:

TABLE II

| Complex Compound | X Value |
|---|---|
| $SrCl_2 \cdot X (NH_3)$ | 0-1, 1-8 |
| $CaCl_2 \cdot X (NH_3)$ | 0-1, 1-2, 2-4, 4-8 |
| $ZnCl_2 \cdot X (NH_3)$ | 0-1, 1-2, 2-4, 4-6 |
| $ZnBr_2 \cdot X (NH_3)$ | 0-1, 1-2, 2-4, 4-6 |
| $ZnI_2 \cdot X (NH_3)$ | 0-1, 1-2, 2-4, 4-6 |
| $CaBr_2 \cdot X (NH_3)$ | 0-1, 1-2, 2-6 |
| $CoCl_2 \cdot X (NH_3)$ | 0-1, 1-2, 2-6 |
| $CoBr_2 \cdot X (NH_3)$ | 0-1, 1-2, 2-6 |
| $CoI_2 \cdot X (NH_3)$ | 0-2, 2-6 |
| $BaCl_2 \cdot X (NH_3)$ | 0-8 |
| $MgCl_2 \cdot X (NH_3)$ | 0-1, 1-2, 2-6 |
| $MgBr_2 \cdot X (NH_3)$ | 0-1, 1-2, 2-6 |
| $MgI_2 \cdot X (NH_3)$ | 0-2, 2-6 |
| $FeCl_2 \cdot X (NH_3)$ | 0-1, 1-2, 2-6 |
| $FeBr_2 \cdot X (NH_3)$ | 0-1, 1-2, 2-6 |
| $FeI_2 \cdot X (NH_3)$ | 0-2, 2-6 |
| $NiCl_2 \cdot X (NH_3)$ | 0-1, 1-2, 2-6 |
| $NiBr_2 \cdot X (NH_3)$ | 0-1, 1-2, 2-6 |
| $NiI_2 \cdot X (NH_3)$ | 0-2, 2-6 |
| $SrI_2 \cdot X (NH_3)$ | 0-1, 1-2, 2-6, 6-8 |
| $SrBr_2 \cdot X (NH_3)$ | 0-1, 1-2, 2-8 |
| $SnCl_2 \cdot X (NH_3)$ | 0-2.5, 2.5-4, 4-9 |
| $SnBr_2 \cdot X (NH_3)$ | 0-1, 1-2, 2-3, 3-5, 5-9 |
| $BaBr_2 \cdot X (NH_3)$ | 0-1, 1-2, 2-4, 4-8 |
| $MnCl_2 \cdot X (NH_3)$ | 0-1, 1-2, 2-6 |
| $MnBr_2 \cdot X (NH_3)$ | 0-1, 1-2, 2-6 |
| $MnI_2 \cdot X (NH_3)$ | 0-2, 2-6 |
| $CaI_2 \cdot X (NH_3)$ | 0-1, 1-2, 2-6, 6-8 |
| $CrCl_2 \cdot X (NH_3)$ | 0-3, 3-6 |
| $LiCl \cdot X (NH_3)$ | 0-1, 1-2, 2-3, 3-4 |
| $LiBr \cdot X (NH_3)$ | 0-1, 1-2, 2-3, 3-4 |
| $NaCl \cdot X (NH_3)$ | 0-5 |
| $NaBr \cdot X (NH_3)$ | 0-5.25 |
| $NaI \cdot X (NH_3)$ | 0-4. 5 |
| $K_2FeCl_5 \cdot X (NH_3)$ | 0-5, 5-6, 6-11 |
| $K_2ZnCl_4 \cdot X (NH_3)$ | 0-5, 5-12 |
| $Mg(Clo_4)_2 \cdot X (NH_3)$ | 0-6 |
| $Mg(NO_3) \cdot X (NH_3)$ | 0-2, 2-4, 4-6 |
| $Sr(Clo_4)_2 \cdot X (NH_2)$ | 0-6, 6-7 |
| $CrBr_3 \cdot X (NH_3)$ | 0-3 |
| $CrCl_2 \cdot X (NH_3)$ | 0-3, 3-6 |
| $VCl_3 \cdot X (NH_3)$ | 0-3, 3-5, 5-6, 6-7, |
| $AlCl_3 \cdot X (NH_3)$ | 0-1, 1-3, 3-5, 5-6, 6-7, 7-14 |
| $CuSO_4 \cdot X (NH_3)$ | 0-1, 1-2, 2-4, 4-5 |

As previously indicated, the actual adsorption and/or desorption reaction periods or half-cycle periods may be as short as about 2 minutes or even less for burst-type applications, and may be extended up to 20-25 minutes under certain part load conditions or special design process conditions. However, the above-described advantages of the invention, i.e., reaction rates, are drastically diminished if half-cycles are carried on beyond about 35 minutes. During any specific adsorption or desorption reaction process, and under the aforesaid conditions of the invention and utilizing the reactors having the improved heat and mass transfer gas diffusion path lengths and preferred thermal path lengths the sorptions are allowed to proceed at relatively fast rates for several minutes, typically at least about 6-12 minutes, often even 15-20 minutes with reactions that yield a significant progress or degree of reaction completion. It is to be understood that the theoretical completion of a sorption process for any given complex compound as disclosed hereinabove depends on the actual coordination range available under the specific process temperature and pressure conditions, which is often less than the theoretical value of a respective complex compound (Table II). Moreover, it is to be understood that the design of the reactors according to the present invention is directed toward high reaction rates and/or close approach pressures and temperatures rather than reaction completion. However, in the sorption processes carried out in the reactors having the aforesaid thermal and mass diffusion path lengths and salt loading densities and under volumetric expansion restrictions according to the invention, the reaction of the refrigerant on the salt or complex compound is typically capable of proceeding to at least 50% of the actual available coordination sphere sorption capacity within 15 minutes or less under process temperature and pressure conditions. Some salts and complex compounds, for example, $CaCl_2 \cdot 4$–8 ($NH_3$) and $SrCl_2 \cdot 1$–8 ($NH_3$) are capable of holding 40% mass or more of refrigerant based on the dry salt mass, and are capable of sorbing at least 20% based on the dry salt weight in less than 15 minutes. Yet other salts, such as $CaBr_2 \cdot 2$–6 ($NH_3$) and $MgBr_2 \cdot 2$–6 ($NH_3$), are capable of holding between about 25% and about 40% of their dry mass and of sorbing at least about 15% of the salt dry mass in less than 12 minutes. Other salts, such as $FeBr_2 \cdot 2$–6 ($NH_3$), are capable of sorbing ammonia equal to at least about 10% of salt dry weight in less than 10 minutes of the sorption process. Reactors of the invention, in which the volumetric expansion of the complex compounds is restricted during the sorption process reactions are capable of taking up, i.e., adsorbing and desorbing, at least 20 milligrams of $NH_3$ per minute and per cc of expanded adsorbent where reaction times are 30 minutes or less. Moreover, where the reaction times are limited to 30 minutes or less, such reactors are capable of taking up 10 milligrams of $NH_3$ per minute per cc of total reactor enclosure volume, i.e., within the total volume of the pressurized reactor enclosure, such process may be limited by possible early completion of the sorption if saturation is obtained in less than 30 minutes.

Reaction rates are typically dependent upon the degree of reaction completion. Equations of the form $$\Delta N = \Delta N_{max}(1 - e^{-kt})$$

where:
$\Delta N$ = reaction extent (moles/mole)
$\Delta N_{max}$ = maximum reaction extent (moles/mole)
$t$ = time (sec)
$k$ = reaction kinetics value (sec$^{-1}$) (k is called herein reaction constant)

can be used to describe reaction progress over time. The above equation is put in a terminology and units useful for complex-compound sorption reactions of the present invention. The reaction constant k describes the time dependency of reaction progress for any time. Reaction rates can be obtained from an expression involving k and time:

$$\text{rate (mole/mole-hr)} = \frac{\Delta N}{(t \times 3600)} = \Delta N_{max} \frac{(1 - e^{-kt})}{(t \times 3600)}$$

with units again convenient for the sorption reactions as described herein. As an example of using these equations, $SrCl_2 \cdot NH_3$ can complex up to 7 moles of ammonia in the 1 to 8 step, so $\Delta N_{max}$ is 7. For a time of 6 minutes (360 seconds) and k value of 0.004 sec$^{-1}$, $\Delta N$ is 5.3 moles of ammonia per mole of salt. Reaction progression this far in 6 minutes requires an average rate over this 6-minute period of 53 moles/mole-hr. A reaction constant of 0.0004 gives $\Delta N$ of 0.94 in 6 minutes, or an average reaction rate of 9.4 moles/mole-hr. Given a reaction constant (k) for any sorber configuration with any salt, the extent of reaction completion and reaction rates at any time are readily determined. The actual amount of refrigerant adsorbed and rates do depend on the size of the sorption step, $\Delta N_{max}$. Sorption rates achievable by the present invention lead to the following minimum values for the reaction constant:

| $\Delta N_{max}$ | k |
|---|---|
| up to 4.5 moles/mole | 0.0004 |
| between 4.5 and 6 moles/mole | 0.0003 |
| above 6 moles/mole | 0.0002 |

Such reaction determinations are useful for adsorption and/or desorption periods of less than about 30 minutes.

The reactivity of the salts may be further enhanced by initially adsorbing a small amount of a gaseous ligand on the salt, which additive ligand is different from the gaseous reactant to be used in the complex compound. Any of the aforesaid polar gaseous reactants may be used, and particularly preferred are water, ammonia, lower aliphatic alcohol, amines, or phosphine. The amount of the additive material is preferably between about 0.05% and about 10% by weight of the salt. The use of a hydrated salt containing a small but effective amount of water adsorbed on the salt may be satisfactory for such a purpose.

For some adsorption/desorption cycle systems, it may be advantageous to use a mixture of a bivariant adsorbent, which does not expand substantially during adsorption of the polar refrigerant, with a monovariant complex compound described hereinabove. Specifically, in bivariant systems utilizing zeolite, activated carbon, activated alumina or silica gel as the adsorbent, which materials do not significantly expand volumetrically on adsorption of the polar refrigerant, the reaction product mass may be substantially improved by combining such adsorbent materials with a metal salt which forms a complex compound during the adsorption reaction with the polar gas. This embodiment may be especially useful for water or ammonia refrigerant systems. The advantage of mixing the metal salt with the bivariant adsorbent is that the resulting adsorbent mass will substantially take on the highly desirable features of the complex compound mass described hereinabove, i.e., controlled density and preferred heat and preferred mass diffusion, enhanced thermal conductivity as well as good contact with heat exchange surfaces and often also the coherent, cohesive, self-supporting structural physical mass having the improved, increased reaction rates as described hereinabove. Any of the aforesaid salts may be used to mix with the bivariant materials, although the salts resulting in the aforesaid specific complex compounds are preferred. The amount of salt used in the mixture may be any ratio, but is preferably between about 5% and about 25%, by weight, depending on the specific salt, as well as the aforesaid variables including the reactor design mass diffusion path length, thermal or heat diffusion path length, and loading density, all of which are dependent on the operating conditions. It will be understood that to obtain the desired improved results utilizing the mixture of the bivariant and monovariant adsorbent materials, the latter which expand substantially during the initial adsorption reaction with a polar gas, requires density control of the adsorbent mass by restricting volumetric expansion of the mixture of combined adsorbents during the sorption reaction process as described hereinabove.

The mixture of bivariant and monovariant adsorbents may also be used to advantage in non-polar gaseous refrigerant systems. Groups of such non-polar refrigerants include the natural gas $C_1$-$C_6$ lower alkanes, e.g. methane, ethane, propane, butane, pentane and hexane, cryogenic refrigerants helium, argon and hydrogen, environmental gases oxygen, nitrogen, hydrogen, $No_2$, $CO_2$ and CO, and CFC, HCFC and HFC fluorocarbon refrigerants. For example, in systems in which methane is to be adsorbed on a zeolite, an aforesaid metal salt may be mixed with the zeolite, and a polar gas charged to the solid mixture which is adsorbed to form a complex compound with the monovariant salt thereby achieving a reaction product mass having the aforesaid improved characteristics. The amount of salt used in these applications may be as low as a few mass percent up to major amounts. Following the initial adsorption, the polar gas is desorbed from the product mass and purged from the reactor. The system is then charged with the non-polar gas and the desired adsorption and desorption reactions may be carried out. Such an advantage may be used for any of the aforesaid bivariant adsorbents with any desired non-polar gas or refrigerant system, providing the mixture of solid monovariant and bivariant adsorbents is first charged with a polar gaseous reactant to produce a mixture including the complex compound having the desired physical improvements. Similarly, the aforesaid improvements may be used in metal hydride adsorbents systems by mixing an aforesaid metal salt with a metal hydride, charging the mixture with ammonia, or other polar gas, to form a complex compound, desorbing the complex compound and purging ammonia or other polar gas from the reactor, and thereafter charging the system with hydrogen to carry out hydrogen adsorption and desorption on the metal hydride. Thus, the invention may be used broadly to improve systems and processes which use a non-expanding solid adsorbent reactant and a polar or non-polar gas to be alternately adsorbed and desorbed thereon. According to the invention, by mixing such non-expanding adsorbents with a suitable amount of a solid reactant which volumetrically expands upon adsorbing a gaseous reactant, and in which restriction and control of such expansion results in an adsorption reaction product having the aforesaid improved physical and/or sorption characteristics, improved system reaction rates may be achieved.

Because of the significant improvement of reaction rates offered by the aforesaid complex compounds, it may be advantageous to combine one of the aforesaid salts with any other adsorbent reactant, i.e., one which is outside of the scope of the aforesaid salts and complex compounds, or which does not achieve the results of improved reaction rates such as described herein.

It may also be advantageous to utilize a mixture of the two or more aforesaid metal salts, for example, one salt which yields a relatively high volumetric expansion complex compound and another salt which has a lower volumetric complex compound expansion. By using a mixture or combination of such salts, for example strontium chloride with calcium chloride or magnesium chloride, or calcium bromide with calcium chloride, the resulting compound may have reaction rates improved from either of the salts, when used alone.

According to another embodiment, the aforesaid reaction rate improvement achieved by optimizing the independent parameters of density, and heat transfer and mass transfer path lengths, may also be applied to gas adsorption reaction products that do not volumetrically expand during adsorption, as generally disclosed in my aforesaid application, and which is incorporated by reference herein. Thus, the reaction rates of reaction products formed between the aforesaid gaseous reactants on zeolites, activated carbon, activated alumina and silica gel, as well as metal hydrides, may be improved according to the aforesaid method of determining the reaction process parameters and reaction conditions to be used, selecting the particular solid and gas to be used, determining the desired adsorption reaction rates in which the system is to be used, determining the thermal and mass diffusion path lengths, respectively, which will yield the desired reaction rates, providing the reactor having the desired reactor cavity dimensions, loading the solid reactant into the reactor at the desired loading density, and maintaining the desired density throughout the reaction process. This may be accomplished in a fixed volume reactor by loading the reactor with solid at the desired density, using necessary compaction, or in a reactor having one or more movable reactor surfaces for maintaining necessary compression against the reactant during the sorption reactions.

In designing a system to take advantage of the improved reaction products described herein, it should be understood that determination of the technical parameters to optimize mass diffusion path length, heat diffusion path length and loading density to maximize sorption rates, although important, must also take into consideration practical parameters. As previously stated, optimization is performed to meet goals of specific operating needs and applications for the apparatus. Practical parameters include the volume of the apparatus, the amount of sorbent used, as well as the heat exchange requirements of the system. Thus, heat exchange component size to achieve the lowest apparatus volume, size and weight of a system which uses a relatively small amount of adsorbent may be important considerations in arriving at the ultimate equipment and system design. As another example, fin count and fin thickness must also take into account such practicalities as not being so thin as to being easily deformed during salt loading, or so thick and/or the fin count so great as to add unnecessary and unpractical excess reactor mass and costs to the system. Minimum system cost is important for residential heat pump sorbers, while minimum system mass is required for other systems, for example, where the apparatus is to be placed in orbit for use in the space program. In yet other systems such as certain consumer products, relatively small sorber volumes may be required. Manufacturing tolerances in producing the reactors having the aforesaid heat and mass transfer path dimensions should also be considered. High powered performance products often require adherence to rigid standards whereas in other products, tolerances of ±5 to ±7% may be acceptable. Such factors may be considered in qualifying or tempering the optimum technical ]parameters which have been independently determined according to the invention.

The methods and apparatus of the present invention are useful where apparatus or system design efficiency requires or dictates improved or optimized adsorption and desorption reaction rates. For example, such reactors are particularly useful in systems such as disclosed in U.S. Pat. No. 5,161,389, comprising an appliance for rapid sorption cooling or freezing, where improved power densities achieved according to the present invention are highly desirable. The present system design and methods of achieving high power densities are also especially useful in cooling systems and apparatus such as disclosed in co-pending application Ser. No. 794,501 filed Nov. 19, 1992. The improvements of the present invention may be used to achieve highly desirable reactor performance in air cooled reactors such as disclosed in U.S. Pat. No. 5,186,020. The descriptions of such apparatus and systems of the aforesaid U.S. patent and co-pending application are incorporated herein by reference. In addition to the aforesaid systems, reactors, and methods of the present invention may be used for achieving improved and optimized reaction rates in staged reaction systems such as disclosed in U.S. Pat. Nos. 5,025,635 and 5,079,928, both of which disclosures are incorporated herein by reference. Specifically, in U.S. Pat. No. 5,025,635, there is disclosed continuous constant pressure staging of solid-vapor chemisorption reactions in which a plurality of different complex compounds are located in a reactor with each complex compound having a different vapor pressure, substantially independent of the concentration of gaseous reactant. The compounds are arranged in the respective reactors in successive order of vapor pressure, and heat transfer fluid is directed through the respective reactors in successive thermal communication with the successively arranged complex compounds. Accordingly, the adsorbents may be introduced into the respective reactors utilizing the aforesaid densities and wherein the reactors have thermal and mass diffusion path lengths disclosed herein, and wherein the volumetric expansion of the complex compounds formed during the sorption reaction process of the polar refrigerant with the metal salt are restricted according to the present invention. Similarly, the systems in which the reactors and methods of the present invention are used may comprise apparatus disclosed in U.S. Pat. No. 5,079,928 in which a plurality of two or more reactors are used, each containing a different complex compound having vapor pressure substantially independent of the concentration of the gaseous reactant. The reactions are staged whereby heat transfer fluids used for heating and cooling the reactants direct heat from an exothermic adsorption reaction to drive an endothermic desorption reaction. Where a plurality of three or more different compounds are used in different reactors, the reactors are placed in successive order of complex compound vapor pressure, and the reactions are staged by successively directing the heat transfer fluid through the reactors in successive order of compound vapor pressure as disclosed in the aforesaid patent.

The thermal and mass diffusion path lengths disclosed herein are intended for use without any additives, in order to avoid inert mass addition. However, the thermal and mass diffusion paths may be extended by about 10% up to about 30%, if appropriate thermal conductivity enhancing or mass diffusivity/porosity enhancing additives are used. Preferred additives are metals or other materials of relatively high conductivity or bivariant sorbents such as carbon , which in some cases exhibit reasonable thermal conductance, at least in selective directions. Other additives include metal wool, sintered metals highly conductive ceramics, carbides and the like, known to those skilled in the art.

However, high additive mass fractions of 20% to 30% or higher need to be carefully selected because of the mass and volume requirement and possible negative effect on the overall power density. The methods of the present invention may be used to advantage in the design or production of a substantial number of useful commercial products and devices. A list of specific types and examples of apparatus and appliances include:

consumer leisure appliances such as small or portable or personal freezers, refrigerators or refrigerator/freezer combination units, refrigerator, freezer or combination appliances which may be installed in recreational vehicles, boats, automobiles or trucks, and minibar refrigerators, freezers or combination units;

kitchen appliances such as rapid freezers, standing alone or combined with microwave and/or standard refrigerator/freezer units, iced tea/coffee makers, ice cube makers, ice cream makers, freeze dryer units, and drink or water coolers;

display and vending equipment and apparatus such as coolers, freezers and ice makers;

durable good appliances such as household refrigerators and freezers and commercial freezers and refrigerators, with or without rapid freeze capability, dehumidifiers and clothes dryers;

building air conditioning appliances including residential split unit air conditioners and heat pumps, light commercial split unit air conditioners and heat pumps, room air conditioners, residential dehumidifiers, and hybrid air conditioning and refrigeration cycle equipment;

air conditioning and cooling systems for personal autos, vans or trucks, or for commercial vehicles such as buses, trains, aircraft, or pleasure or commercial boats and ships, including vehicle AC systems, vehicle thermal storage systems and vehicular seat or bench cooling systems;

electronic cooling apparatus for electronic and chip cooling and electronics system box air conditioning;

miscellaneous equipment and appliances such as unitary HVAC products and HVAC products in excess of 20 RT capacity, medical and laboratory appliances, environmental suits, military products including combat, pilot and astronaut suits, industrial and commercial heat pumps, boilers, thermal energy storage equipment, gas turbine air conditioning, commercial dehumidifiers, aerospace cooling refrigeration equipment, etc.

The above list is not intended to be exhaustive, but rather to give representative examples of specific types of apparatus that may incorporate the apparatus and methods of the present invention. These as well as other systems may incorporate the advantages and components of the present invention.

What is claimed is:

1. An improved chemisorption reaction process in which a polar gas is repeatedly alternately adsorbed and desorbed on a complex compound formed by adsorbing said polar gas on a metal salt comprising a halide, nitrate, nitrite, oxalate, perchlorate, sulfate or sulfite of an alkali metal, alkaline earth metal, transition metal, zinc, cadmium, tin, aluminum, sodium borofluoride, or double metal chloride, said process comprising carrying out said reaction process at half-cycle reaction periods of less than about 30 minutes in a reactor having one or more reaction chambers having a maximum thermal diffusion path length of less than about 4.5 mm and a maximum mean mass diffusion path length of less than about 15 mm, and restricting the volumetric expansion of said complex compound formed during said chemisorption reaction.

2. The process of claim 1 wherein said polar gas is ammonia and said metal salt comprises $SrCl_2$, $SrBr_2$, $CaCl_2$, $CaBr_2$, $CaI_2$, $CoCl_2$, $CoBr_2$, $BaCl_2$, $BaBr_2$, $MgCl_2$, $MgBr_2$, $FeCl_2$, $FeBr_2$, $NiCl_2$, $ZnCl_2$, $SnCl_2$, $SnBr_2$, $MnCl_2$, $MnBr_2$, $CrCl_2$, $LiCl$ or mixtures thereof.

3. The process of claim 2 including controlling the volumetric expansion of said complex compound formed during at least the initial adsorption reaction of said polar gas on said metal salt to form at least a partially structurally immobilized, self-supporting, coherent, reaction product mass.

4. The process of claim 1 wherein said metal salt is introduced into said one or more reaction chambers at a density of between about 0.2 and about 1.0 g/cc of reaction chamber volume.

5. The process of claim 4 wherein said complex compound is $SrCl_2 \bullet 1-8$ ($NH_3$), said density is 0.4 to 0.8 g/cc, said mean mass diffusion path length is between 2.5 and 7 mm, and said thermal diffusion path length is 0.6 to 2.5 mm.

6. The process of claim 4 wherein said complex compound is $CaBr_2 \bullet 2-6$ ($NH_3$), said density is 0.4 to 0.8 g/cc, said mean mass diffusion path length is between 3 and 6 mm, and said thermal diffusion path length is 0.6 to 3.0 mm.

7. The process of claim 4 wherein said complex compound is $CaCl_2 \bullet 2-4$, $4-8$ ($NH_3$), said density is 0.2 to 0.6 g/cc, said mean mass diffusion path length is between 2.5 and 6 mm, and said thermal diffusion path length is 0.6 to 3 mm.

8. The process of claim 4 wherein said complex compound is $CaCl_2 \bullet 0-1$, $1-2$ ($NH_3$), said density is between 0.2 to 0.7 g/cc, said mean mass diffusion path length is between 3 and 6 mm, and said thermal diffusion path length is 0.6 to 3 mm.

9. The process of claim 4 wherein said complex compound is $CoCl_2 \bullet 2-6$ ($NH_3$), said density is 0.2 to 0.8 g/cc, said mean mass diffusion path length is between 2.5 and 6 mm, and said thermal diffusion path length is 0.6 to 3 mm.

10. The process of claim 4 wherein said complex compound is $NiCl_2 \bullet 2-6$ ($NH_3$), said density is 0.2 to 0.7 g/cc, said mean mass diffusion path length is between 3 and 6 mm, and said thermal diffusion path length is between 0.6 to 3 mm.

11. The process of claim 4 wherein said complex compound is $BaCl_2 \bullet 0-8$ ($NH_3$), said density is 0.4 to 0.9 g/cc, said mean mass diffusion path length is between 3 and 6 mm, and said thermal diffusion path length is 0.6 to 3 mm.

12. The process of claim 4 wherein said complex compound is $CoCl_2 \bullet 0-1$, $1-2$ ($NH_3$), said density is 0.3 to 0.8 g/cc, said mean mass diffusion path length is between 2.5 and 6 mm, and said thermal diffusion path length is 0.6 to 3 mm.

13. The process of claim 4 wherein said complex compound is $LiCl \bullet 0-3$ ($NH_3$), said density is 0.2 to 0.5 g/cc, said mean mass diffusion path length is between 2.5 and 6 mm, and said thermal diffusion path length is 0.6 and 3 mm.

14. The process of claim 4 wherein said complex compound is $SrBr_2 \bullet 2-8$ ($NH_3$), said density is 0.4 to 0.8 g/cc, said mean mass diffusion path length is between 2.5 and 6 mm, and said thermal diffusion path length is 0.6 to 3 mm.

15. The process of claim 4 wherein said complex compound is $MnCl_2 \cdot 2-6 \,(NH_3)$, said density is 0.3 to 0.8 g/cc, said mean mass diffusion path length is between 2.5 and 6 mm, and said thermal diffusion path length is 0.6 to 3 mm.

16. The process of claim 4 wherein said complex compound is $CaI_2 \cdot 2-6 \,(NH_3)$, said density is 0.3 to 0.9 g/cc, said mean mass diffusion path length is between 3 and 6 mm, and said thermal diffusion path length is 0.6 to 3 mm.

17. The process of claim 4 wherein said complex compound is $MgCl_2 \cdot 2-6 \,(NH_3)$, said density is 0.3 to 0.8 g/cc, said mean mass diffusion path length is between 2.5 and 6 mm, and said thermal diffusion path length is 0.6 to 3 mm.

18. The process of claim 4 wherein said complex compound is $FeBr_2 \cdot 2-6 \,(NH_3)$, said density is 0.4 to 0.8 g/cc, said mean mass diffusion path length is between 3 and 6 mm, and said thermal diffusion path length is 0.6 to 3 mm.

19. The process of claim 1 wherein the complex compound is $SrBr_2 \cdot 2-8 \,(NH_3)$, the pressure in the reactor during said process is 45 psia or greater, the loading density of said salt is 0.5 to 1.8 g/cc of reaction chamber volume, said mean mass diffusion path length is between 2.5 and 6 mm, and said thermal diffusion path length is 0.6 to 3 mm.

20. The process of claim 1 wherein said reaction process is carried out at an average reaction rate of above 6 moles/mol-hr for at least 6 minutes.

21. A chemisorption reaction process comprising repeatedly alternately adsorbing and desorbing a polar gas on a complex compound formed by adsorbing said polar gas on a metal salt comprising a halide, nitrate, nitrite, oxalate, perchlorate, sulfate or sulfite of an alkali metal, alkaline earth metal, transition metal, zinc, cadmium, tin, aluminum, sodium borofluoride, or double metal chloride, restricting the volumetric expansion of said complex compound during said chemisorption reaction, and carrying out said process in a reactor having one or more reaction chambers having a maximum thermal diffusion path length of less than about 4.5 mm at adsorption and desorption reaction cycle time periods of less than about 30 minutes, respectively.

22. The reaction process of claim 21 including carrying out said reaction process in a reactor having one or more reaction chambers having a maximum mean mass diffusion path length of less than about 15 mm.

23. The reaction process of claim 22 wherein said polar gas is ammonia.

24. The reaction process of claim 22 wherein said metal salt comprises a mixture of two or more of said metal salts.

25. The reaction process of claim 21 wherein said reaction is carried out in a reactor having a maximum thermal diffusion path length of between about 0.6 and about 3 mm.

26. The reaction process of claim 21 wherein said polar gas is ammonia and said reaction process is carried out in a reactor having one or more reaction chambers having a maximum thermal diffusion path length of between about 0.6 and about 3 mm, a maximum mass diffusion path length between about 2.5 and about 7 mm, and wherein said salt is introduced into said reaction chambers at a loading density of between about 0.2 and about 0.8 g/cc of reaction chamber volume.

27. The reaction process of claim 26 wherein said reaction time of each adsorption and desorption cycle is less than about 20 minutes, respectively.

28. The reaction process of claim 21 wherein said reaction process is carried out at an average reaction rate of above about 6 moles/mol-hr for at least about 6 minutes.

29. The process of claim 21 wherein said polar gas is ammonia and said metal salt comprises $SrCl_2$, $SrBr_2$, $CaCl_2$, $CaBr_2$, $CaI_2$, $CoCl_2$, $CoBr_2$, $BaCl_2$, $BaBr_2$, $MgCl_2$, $MgBr_2$, $FeCl_2$, $FeBr_2$, $NiCl_2$, $ZnCl_2$, $SnCl_2$, $SnBr_2$, $MnCl_2$, $MnBr_2$, $CrCl_2$, $LiCl$ or mixtures thereof.

30. The reaction process of claim 21 wherein said polar gas is ammonia, and wherein said complex compound adsorbs and/or desorbs at least 20 milligrams of ammonia per cc per minute of adsorption or desorption cycle time, respectively.

31. The reaction process of claim 21 wherein said polar gas is ammonia and wherein said complex compound adsorbs and/or desorbs at least 10 milligrams of ammonia per minute per cc of total reaction chamber volume.

32. The reaction process of claim 21 wherein said polar gas is ammonia, wherein rates of reaction are determined by the formula $$\Delta N = \Delta N_{max}(1 - e^{-kt})$$

where:
$\Delta N$ = reaction extent (moles/mole)
$\Delta N_{max}$ = maximum reaction extent (moles/mole)
t = time (sec)
k = reaction kinetics value (sec$^{-1}$)
wherein the reaction is carried out to a reaction extent of up to 4.5 moles/mole, and wherein the minimum value of k is 0.0004.

33. The reaction process of claim 21 wherein said polar gas is ammonia, wherein rates of reaction are determined by the formula $$\Delta N = \Delta N_{max}(1 - e^{-kt})$$

where:
$\Delta N$ = reaction extent (moles/mole)
$\Delta N_{max}$ = maximum reaction extent (moles/mole)
t = time (sec)
k = reaction kinetics value (sec$^{-1}$)
wherein the reaction is carried out to a reaction extent of between 4.5 and 6 moles/mole, and wherein the minimum value of k is 0.0003.

34. The reaction process of claim 21 wherein said polar gas is ammonia, where=in rates of reaction are determined by the formula $$\Delta N = \Delta N_{max}(1 - e^{-kt})$$

where:
$\Delta N$ = reaction extent (moles/mole)
$\Delta N_{max}$ = maximum reaction extent (moles/mole)
t = time (sec)
k = reaction kinetics value (sec$^{-1}$)
wherein the reaction is carried out to a reaction extent of above moles/mole, and wherein the minimum value of k is 0.0002.

35. The reaction process of claim 21 including carrying out said process in a reactor having one or more gas permeable heat exchange surfaces and distributing said polar gas along at least a portion of said heat exchange surface.

36. The reaction process of claim 21 including carrying out said process in a reactor having one or more gas permeable surfaces in contact with said salt and said complex compound and distributing said polar gas to said salt and said complex compound along at least a portion of said gas permeable surface.

37. The reaction process of claim 36 wherein said polar gas is ammonia and wherein said complex compound adsorbs and/or desorbs at least 10 milligrams of ammonia per minute per cc of total reaction chamber volume.

38. The reaction process of claim 21 including mixing said metal salt with a gas permeable admixture composition having a microporous surface and carrying out said adsorption and desorption reactions using said mixture whereby said gas permeable admixture composition distributes said polar gas in said complex compound mass.

39. An improved chemisorption reaction process in which a polar gas is repeatedly alternately adsorbed and desorbed on a complex compound formed by adsorbing said polar gas on a metal salt comprising a halide, nitrate, nitrite, oxalate, perchlorate, sulfate or sulfite of an alkali metal, alkaline earth metal, transition metal, zinc, cadmium, tin, aluminum, sodium borofluoride, or double metal chloride, said process comprising,
carrying out said reaction process in a reactor having one or more reaction chambers having a maximum mean mass diffusion path length of less than about 15 mm, and restricting the volumetric expansion of said complex compound during said chemisorption reaction.

40. The reaction process of claim 39 including carrying out said reaction process at adsorption and desorption reaction cycle time periods of less than about 30 minutes each, respectively.

41. The reaction process of claim 39 wherein said reaction process is carried out at an average reaction rate of above 6 moles/mol-hr.

42. The reaction process of claim 40 wherein the said reaction cycle time periods are each between about 3 and about 20 minutes.

43. The reaction process of claim 39 wherein said reaction is carried out in a reactor having a maximum thermal diffusion path length of less than about 3 mm.

44. The reaction process of claim 39 wherein said polar gas is ammonia and said metal salt comprises $SrCl_2$, $SrBr_2$, $CaCl_2$, $CaBr_2$, $CaI_2$, $CoCl_2$, $CoBr_2$, $BaCl_2$, $BaBr_2$, $MgCl_2$, $MgBr_2$, $FeCl_2$, $FeBr_2$, $NiCl_2$, $ZnCl_2$, $SnCl_2$, $SnBr_2$, $MnCl_2$, $MnBr_2$, $CrCl_2$, $LiCl$ or mixtures thereof.

45. The reaction process of claim 39 wherein said polar gas is ammonia, and wherein said complex compound adsorbs and/or desorbs at least 20 milligrams of ammonia per minute per cc of total reaction chamber volume.

46. The reaction process of claim 39 wherein said polar gas is ammonia, wherein rates of reaction are determined by the formula $$\Delta N = \Delta N_{max}(1 - e^{-kt})$$

where:
$\Delta N$ = reaction extent (moles/mole)
$\Delta N_{max}$ = maximum reaction extent (moles/mole)
$t$ = time (sec)
$k$ = reaction kinetics value (sec$^{-1}$)
wherein the reaction is carried out to a reaction extent of up to 4.5 moles/mole, and wherein the minimum value of k is 0.0004.

47. The reaction process of claim 39 wherein said polar gas is ammonia, wherein rates of reaction are determined by the formula $$\Delta N = \Delta N_{max}(1 - e^{-kt})$$

where:
$\Delta N$ = reaction extent (moles/mole)
$\Delta N_{max}$ = maximum reaction extent (moles/mole)
$t$ = time (sec)
$k$ = reaction kinetics value (sec$^{-1}$)
wherein the reaction is carried out to a reaction extent of between 4.5 and 6 moles/mole, and wherein the minimum value of k is 0.0003.

48. The reaction process of claim 38 wherein said polar gas is ammonia, wherein rates of reaction are determined by the formula $$\Delta N = \Delta N_{max}(1 - e^{-kt})$$

where:
$\Delta N$ = reaction extent (moles/mole)
$\Delta N_{max}$ = maximum reaction extent (moles/mole)
$t$ = time (sec)
$k$ = reaction kinetics value (sec$^{-1}$)
wherein the reaction is carried out to a reaction extent of above 6 moles/mole, and wherein the minimum value of k is 0.0002.

49. The reaction process of claim 39 including carrying out said process in a reactor having one or more gas permeable heat exchange surfaces and distributing said polar gas along at least a portion of said heat exchange surface.

50. The reaction process of claim 39 including mixing said metal salt with a gas permeable admixture composition having a microporous surface and carrying out said adsorption and desorption reactions using said mixture whereby said gas permeable admixture composition distributes said polar gas in said complex compound mass.

51. The reaction process of claim 38 including carrying out said reaction in a reactor containing one or more gas permeable surfaces in contact with said salt and said complex compound and distributing said polar gas to said salt and said complex compound along at least a portion of said gas permeable surface.

52. An improved chemisorption reaction process in which a polar gas is repeatedly alternately adsorbed and desorbed on a complex compound formed by adsorbing said polar gas on a metal salt comprising a halide, nitrate, nitrite, oxalate, perchlorate, sulfate or sulfite of an alkali metal, alkaline earth metal, transition metal, zinc, cadmium, tin, aluminum, sodium borofluoride, or double metal chloride, said process comprising
loading said metal salt in a reactor whereby at least about 60% of the mass of said salt is within 25 mm or less of a gas distribution means in said reactor, and restricting the volumetric expansion of said complex compound during said chemisorption reaction.

53. The reaction process of claim 52 including carrying out said reaction process at adsorption and desorption reaction cycle time periods of less than about 30 minutes each, respectively.

54. The reaction process of claim 53 wherein the said reaction cycle time periods are each of between about 3 and about 20 minutes duration.

55. The reaction process of claim 52 wherein said reaction process is carried out at an average reaction rate of above 6 moles/mol-hr.

56. The reaction process of claim 52 wherein said reaction is carried out in a reaction having a maximum thermal diffusion path length of less than about 3 mm.

57. The reaction process of claim 52 wherein said polar gas is ammonia and said metal salt comprises $SrCl_2$, $SrBr_2$, $CaCl_2$, $CaBr_2$, $CaI_2$, $CoCl_2$, $CoBr_2$, $BaCl_2$, $BaBr_2$, $MgCl_2$, $MgBr_2$, $FeCl_2$, $FeBr_2$, $NiCl_2$, $ZnCl_2$, $SnCl_2$, $SnBr_2$, $MnCl_2$, $MnBr_2$, $CrCl_2$, $LiCl$ or mixtures thereof.

58. The reaction process of claim 52 including carrying out said process in a reactor having one or more gas permeable heat exchange surfaces and distributing said polar gas along at least a portion of said heat exchange surface.

59. The reaction process of claim 52 including mixing said metal salt with a gas permeable admixture composition having a microporous surface and carrying out said adsorption and desorption reactions using said mixture whereby said gas distribution admixture composition distributes said polar gas in said complex compound mass.

60. The reaction process of claim 52 including carrying out said reaction in a reactor containing one or more gas permeable surfaces in contact with said salt and said complex compound and distributing said polar gas to said salt and said complex compound along at least a portion of said gas permeable surface.

61. An improved chemisorption reaction process in which a polar gas is repeatedly alternately adsorbed and desorbed on a complex compound formed by adsorbing said polar gas on a metal salt comprising a halide, nitrate, nitrite, oxalate, perchlorate, sulfate or sulfite of an alkali metal, alkaline earth metal, transition metal, zinc, cadmium, tin, aluminum, sodium borofluoride or double metal chloride, said process comprising
carrying out said reaction process in a reactor having a maximum heat diffusion path length of less than 1.5 mm, and restricting the volumetric expansion of said complex compound during said chemisorption reaction.

62. The reaction process of claim 61 including carrying out said reaction process at adsorption and desorption reaction cycle time periods of less than about 30 minutes each, respectively.

63. The reaction process of claim 62 wherein the said reaction cycle time periods are each of between about 3 and about 20 minutes duration.

64. The reaction process of claim 61 wherein said reaction process is carried out at an average reaction rate of above 6 moles/mol-hr.

65. The reaction process of claim 61 wherein said reaction is carried out in a reactor having a maximum thermal diffusion path length of between about 0.5 mm and about 1.4 mm.

66. The reaction process of claim 61 wherein said polar gas is ammonia and said metal salt comprises $SrCl_2$, $SrBr_2$, $CaCl_2$, $CaBr_2$, $CaI_2$, $CoCl_2$, $CoBr_2$, $BaCl_2$, $BaBr_2$, $MgCl_2$, $MgBr_2$, $FeCl_2$, $FeBr_2$, $NiCl_2$, $ZnCl_2$, $SnCl_2$, $SnBr_2$, $MnCl_2$, $MnBr_2$, $CrCl_2$, $LiCl$ or mixtures thereof.

67. The reaction process of claim 61 including carrying out said process in a reactor having one or more gas permeable heat exchange surfaces and distributing said polar gas along at least a portion of said heat exchange surface.

68. The reaction process of claim 61 including mixing said metal salt with a gas permeable admixture composition having a microporous surface and carrying out said adsorption and desorption reactions using said mixture whereby said gas distribution admixture composition distributes said polar gas in said complex compound mass.

69. The reaction process of claim 68 including carrying out said reaction process at adsorption and desorption reaction cycle time periods of less than about 30 minutes each, respectively.

70. The reaction process of claim 61 including carrying out said reaction in a reactor containing one or more gas permeable surfaces in contact with said salt and said complex compound and distributing said polar gas to said salt and said complex compound along at least a portion of said gas permeable surface.

71. The reaction process of claim 61 wherein said polar gas is ammonia, and wherein said complex compound adsorbs and/or desorbs at least 20 milligrams of ammonia per cc per minute of adsorption or desorption cycle time, respectively.

72. The reaction process of claim 61 wherein said polar gas is ammonia and wherein said complex compound adsorbs and/or desorbs at least 10 milligrams of ammonia per minute per cc of total reaction chamber volume.

73. The reaction process of claim 72 wherein said polar gas is ammonia, and wherein said complex compound adsorbs and/or desorbs at least 20 milligrams of ammonia per cc per minute of adsorption or desorption cycle time, respectively.

74. The reaction process of claim 72 wherein said polar gas is ammonia and wherein said complex compound adsorbs and/or desorbs at least 10 milligrams of ammonia per minute per cc of total reaction chamber volume.

75. The reaction process of claim 72 wherein said polar gas is ammonia, wherein rates of reaction are determined by the formula $$\Delta N = \Delta N_{max}(1 - e^{-kt})$$

where:
$\Delta N$ = reaction extent (moles/mole)
$\Delta N_{max}$ = maximum reaction extent (moles/mole)
t = time (see)
k = reaction kinetics value (sec$^{-1}$)
wherein the reaction is carried out to a reaction extent of up to 4.5 moles/mole, and wherein the minimum value of k is 0.0004.

76. The reaction process of claim 72 wherein said polar gas is ammonia, wherein rates of reaction are determined by the formula $$\Delta N = \Delta N_{max}(1 - e^{-kt})$$

where:
$\Delta N$ = reaction extent (moles/mole)
$\Delta N_{max}$ = maximum reaction extent (moles/mole)
t = time (see)
k = reaction kinetics value (sec$^{-1}$)
wherein the reaction is carried out to a reaction extent of between 4.5 and 6 moles/mole, and wherein the minimum value of k is 0.0003.

77. The reaction process of claim 72 wherein said polar gas is ammonia, wherein rates of reaction are determined by the formula $$\Delta N = \Delta N_{max}(1-e^{-kt})$$

where:
$\Delta N$ = reaction extent (moles/mole)
$\Delta N_{max}$ = maximum reaction extent (moles/mole)
$t$ = time (sec)
$k$ = reaction kinetics value (sec$^{-1}$)
wherein the reaction is carried out to a reaction extent of above 6 moles/mole, and wherein the minimum value of k is 0.0002.

78. The reaction process of claim 61 wherein said polar gas is ammonia, wherein rates of reaction are determined by the formula $$\Delta N = \Delta N_{max}(1-e^{-kt})$$

where:
$\Delta N$ = reaction extent (moles/mole)
$\Delta N_{max}$ = maximum reaction extent (moles/mole)
$t$ = time (sec)
$k$ = reaction kinetics value (sec$^{-1}$)
wherein the reaction is carried out to a reaction extent of up to 4.5 moles/mole, and wherein the minimum value of k is 0.0004.

79. The reaction process of claim 61 wherein said polar gas is ammonia, wherein rates of reaction are determined by the formula $$\Delta N = \Delta N_{max}(1-e^{-kt})$$

where:
$\Delta N$ = reaction extent (moles/mole)
$\Delta N_{max}$ = maximum reaction extent (moles/mole)
$t$ = time (sec)
$k$ = reaction kinetics value (sec$^{-1}$)
wherein the reaction is carried out to a reaction extent of between 4.5 and 6 moles/mole, and wherein the minimum value of k is 0.0003.

80. The reaction process of claim 61 wherein said polar gas is ammonia, wherein rates of reaction are determined by the formula $$\Delta N = \Delta N_{max}(1-e^{-kt})$$

where:
$\Delta N$ = reaction extent (moles/mole)
$\Delta N_{max}$ = maximum reaction extent (moles/mole)
$t$ = time (sec)
$k$ = reaction kinetics value (sec$^{-1}$)
wherein the reaction is carried out to a reaction extent of above 6 moles/mole, and wherein the minimum value of k is 0.0002.

81. The reaction process of claim 61 wherein said reaction is carried out in a reactor having a maximum mean mass diffusion path length of less than about 15 mm.

82. In a chemisorption reaction process in which a polar gas is alternately adsorbed and desorbed on a reaction product of zeolite, activated carbon, activated alumina or silica gel and said polar gas, a method of improving the chemisorption reaction rates of said reaction process comprising:
mixing said zeolite, activated carbon, activated alumina or silica gel with a metal salt comprising a halide, nitrate, nitrite, oxalate, perchlorate, sulfate or sulfite of an alkali metal, alkaline earth metal, transition metal, zinc, cadmium, tin, aluminum, sodium borofluoride, or double metal chloride,
introducing the mixture of said zeolite, activated carbon, activated alumina or silica gel and said metal salt in a reaction chamber having a maximum mean mass diffusion path length of less than about 15 mm, and
adsorbing said polar gas on said mixture while limiting the volumetric expansion of the reaction product during the chemisorption reaction.

83. The reaction process of claim 82 wherein said reaction process is carried out at an average reaction rate of above 6 moles/mol-hr for at least about 6 minutes.

84. The reaction process of claim 83 wherein the said reaction cycle time periods are each of between 3 and 20 minutes duration.

85. The reaction process of claim 82 wherein said reaction process is carried out at an average reaction rate of above 6 moles/mol-hr.

86. The reaction process of claim 82 wherein said reactor has a maximum thermal diffusion path length of less than about 3 mm.

87. The reaction process of claim 70 wherein said polar gas is ammonia and said metal salt comprises $SrCl_2$, $SrBr_2$, $CaCl_2$, $CaBr_2$, $CaI_2$, $CoCl_2$, $CoBr_2$, $BaCl_2$, $BaBr_2$, $MgCl_2$, $MgBr_2$, $FeCl_2$, $FeBr_2$, $NiCl_2$, $ZnCl_2$, $SnCl_2$, $SnBr_2$, $MnCl_2$, $MnBr_2$, $CrCl_2$, $LiCl$ or mixtures thereof.

88. A sorption reaction process in which a non-polar gas is alternately adsorbed and desorbed on a reaction product of said gas and an adsorbent comprising zeolite, activated carbon, activated alumina, silica gel or a metal hydride, said process comprising:
mixing said adsorbent with a metal salt comprising a halide, nitrate, nitrite, oxalate, perchlorate, sulfate or sulfite of an alkali metal, alkaline earth metal, transition metal, zinc, cadmium, tin, aluminum, sodium borofluoride, or double metal chloride,
introducing said mixture in a reaction chamber having a maximum mean mass diffusion path length of less than about 15 mm,
adsorbing a polar gas on said mixture and forming a complex compound of said polar gas and said metal salt while limiting the volumetric expansion of the complex compound during the sorption reaction,
desorbing said polar gas from said complex compound and purging said polar gas from said reaction chamber, and introducing said non-polar gas into said reaction chamber and carrying out said sorption reaction.

89. The process of claim 88 wherein said non-polar gas comprises hydrogen and said adsorbent comprises a metal hydride.

90. The process of claim 88 wherein said non-polar gas comprises a $C_1$ to $C_6$ lower alkane or mixtures thereof, helium, argon, hydrogen, oxygen, carbon dioxide, carbon monoxide, $NO_x$ or a fluorocarbon refrigerant and said adsorbent comprises zeolite, activated carbon, activated alumina or silica gel.

91. The reaction process of claim 88 wherein said reaction process is carried out at an average reaction rate of above 6 moles/mol-hr for at least about 6 minutes.

92. The reaction process of claim 88 including carrying out said reaction process at adsorption and desorption reaction cycle time periods of less than about 30 minutes each, respectively.

93. The reaction process of claim 92 wherein said reaction process is carried out at an average reaction rate of above 6 moles/mol-hr.

94. The reaction process of claim 88 wherein the said reaction cycle time periods are each of between 3 and 20 minutes duration.

95. The reaction process of claim 88 wherein said reactor has a maximum thermal diffusion path length of less than about 3 mm.

96. The reaction process of claim 88 wherein said polar gas is ammonia and said metal salt comprises $SrCl_2$, $SrBr_2$, $CaCl_2$, $CaBr_2$, $CaI_2$, $CoCl_2$, $CoBr_2$, $BaCl_2$, $BaBr_2$, $MgCl_2$, $MgBr_2$, $FeCl_2$, $FeBr_2$, $NiCl_2$, $ZnCl_2$, $SnCl_2$, $SnBr_2$, $MnCl_2$, $MnBr_2$, $CrCl_2$, $LiCl$ or mixtures thereof.

97. A reactor for alternately adsorbing and desorbing a polar gas on a complex compound formed by adsorbing said gas on metal salt comprising a halide, nitrate, nitrite, oxalate, perchlorate, sulfate or sulfite of an alkali metal, alkaline earth metal, transition metal, zinc, cadmium, tin, aluminum, sodium borofluoride, or double metal chloride, said reactor comprising one or more reaction chambers having a maximum mean mass diffusion path length of less than about 15 mm, said reactor containing said metal salt or said complex compound therein, and wherein the reaction chamber includes means for restricting the volumetric expansion of said complex compound.

98. The reactor of claim 97 wherein said one or more reaction chambers have a maximum thermal diffusion path length of between about 0.6 and about 3 mm, a maximum mean mass diffusion path length of between about 2.5 and about 7 mm, and wherein said salt or said complex compound has a density of between about 0.2 and about 0.8 g/cc of reaction chamber volume.

99. The reactor of claim 97 including a plurality of heat transfer fins extending along said reactor and in heat transfer communication with said metal salt, wherein the distance between said fins is 2.8 mm or less.

100. The reactor of claim 97 wherein said one or more reaction chambers has a maximum thermal diffusion path length of less than about 4.5 mm.

101. The reactor of claim 97 wherein said complex compound or said metal salt has a density in said reactor of between about 0.2 and about 1.0 g/cc of reaction chamber volume.

102. The reactor of claim 97 including gas distribution means for directing said polar gas to and from said metal salt or said complex compound in said one or more reaction chambers, and wherein at least 60% of said metal salt or said complex compound, by weight, is within 25 mm or less of a gas distribution means.

103. The reactor of claim 97 including one or more heat exchange surfaces in thermal contact with said metal salt and said complex compound and comprising a gas permeable material.

104. The reactor of claim 97 including one or more gas permeable surfaces extending into said reaction chamber in contact with said metal salt and said complex compound along at least a portion of said gas permeable surface.

105. The reactor of claim 97 wherein said metal salt and said complex compound comprise a mixture thereof, respectively, with a gas permeable admixture composition having a microporous surface for distributing said polar gas in said mixture.

106. A reactor for alternately adsorbing and desorbing a polar gas on a complex compound formed by adsorbing said gas on metal salt comprising a halide, nitrate, nitrite, oxalate, perchlorate, sulfate or sulfite of an alkali metal, alkaline earth metal, transition metal, zinc, cadmium, tin, aluminum, sodium borofluoride, or double metal chloride, said reactor comprising one or more reaction chambers having a maximum thermal diffusion path length of less than 1.5 mm, and said reactor containing said metal salt or said complex compound therein, and wherein the reaction chamber includes means for restricting the volumetric expansion of said complex compound.

107. The reactor of claim 106 including gas distribution means for directing said polar gas to and from said metal salt or said complex compound in said reaction chambers, and wherein at least 60% of said metal salt or said complex compound, by weight, is within 25 mm or less of a gas distribution means.

108. The reactor of claim 106 wherein said one or more reaction chambers have a maximum mean mass diffusion path length of less than about 15 mm.

109. The reactor of claim 106 including one or more heat exchange surfaces in thermal contact with said metal salt and said complex compound and comprising a gas permeable material.

110. The reactor of claim 106 including one or more gas permeable surfaces extending into said reaction chamber in contact with said metal salt and said complex compound along at least a portion of said gas permeable surface.

111. The reactor of claim 106 wherein said metal salt and said complex compound comprise a mixture thereof, respectively, with a gas permeable admixture composition having a microporous surface for distributing said polar gas in said mixture.

112. A reactor for alternately adsorbing and desorbing a polar gas on a complex compound formed by adsorbing said gas on metal salt comprising a halide, nitrate, nitrite, oxalate, perchlorate, sulfate or sulfite of an alkali metal, alkaline earth metal, transition metal, zinc, cadmium, tin, aluminum, sodium borofluoride, or double metal chloride, said reactor comprising one or more reaction chambers having means for directing said polar gas to and from said metal salt or said complex compound in said reaction chambers, and wherein at least 60% of said metal salt or said complex compound, by weight, is within 25 mm or less of a gas distribution means, said reactor containing said metal salt or said complex compound therein, and wherein the reaction chamber includes means for restricting the volumetric expansion of said complex compound.

113. The reactor of claim 112 wherein said one or more reaction chambers have a maximum thermal diffusion path length of less than 1.5 mm.

114. The reactor of claim 112 including one or more heat exchange surfaces in thermal contact with said metal salt and said complex compound and comprising a gas permeable material.

115. The reactor of claim 112 including one or more gas permeable surfaces extending into said reaction chamber in contact with said metal salt and said complex compound along at least a portion of said gas permeable surface.

116. The reactor of claim 112 wherein said metal salt and said complex compound, respectively, comprise a mixture thereof with a gas permeable admixture composition having a microporous surface for distributing said polar gas in said mixture.

* * * * *